US010246272B2

(12) United States Patent
Zuckerman et al.

(10) Patent No.: US 10,246,272 B2
(45) Date of Patent: Apr. 2, 2019

(54) LOAD-CONVEYING AND TRANSPORT APPARATUS AND METHODS

(71) Applicant: SERVERLIFT CORPORATION, Phoenix, AZ (US)

(72) Inventors: Raymond S. Zuckerman, Scottsdale, AZ (US); J. Alexander Dondanville, Laveen, AZ (US)

(*) Notice: Subject to any disclaimer, the term of this patent is extended or adjusted under 35 U.S.C. 154(b) by 0 days.

(21) Appl. No.: 15/972,189

(22) Filed: May 6, 2018

(65) Prior Publication Data

US 2018/0265310 A1 Sep. 20, 2018

Related U.S. Application Data

(63) Continuation of application No. 15/458,927, filed on Mar. 14, 2017, now Pat. No. 9,963,302.

(51) Int. Cl.
| B65G 47/88 | (2006.01) |
| B65G 21/12 | (2006.01) |
| B65G 39/02 | (2006.01) |
| B65G 13/12 | (2006.01) |
| B65G 13/11 | (2006.01) |
| B65G 13/075 | (2006.01) |

(52) U.S. Cl.
CPC ....... *B65G 47/8869* (2013.01); *B65G 13/075* (2013.01); *B65G 13/11* (2013.01); *B65G 13/12* (2013.01); *B65G 21/12* (2013.01); *B65G 39/025* (2013.01); *B65G 2205/04* (2013.01)

(58) Field of Classification Search
CPC ...... B65G 13/075; B65G 13/11; B65G 13/12; B65G 21/12; B65G 39/025; B65G 47/8815; B65G 47/8869; B65G 2205/04
See application file for complete search history.

(56) References Cited

U.S. PATENT DOCUMENTS

| 2,736,423 | A | 11/1952 | Beals |
| 7,497,317 | B2 | 3/2009 | Chang et al. |
| 8,800,746 | B1 | 8/2014 | Pahlow |
| 2006/0070859 | A1* | 4/2006 | Pahlow ............... B65G 15/10 198/809 |
| 2009/0020393 | A1* | 1/2009 | Garwood ............. B65G 13/071 198/345.3 |

* cited by examiner

*Primary Examiner* — Gene O Crawford
*Assistant Examiner* — Keith R Campbell
(74) *Attorney, Agent, or Firm* — Michael W. Goltry; Robert A. Parsons; Parsons & Goltry, PLLC

(57) ABSTRACT

A load-conveying and transport apparatus includes a first frame, a conveyor carried by the first frame, and a second frame mounted to the first frame for movement between lowered and raised positions relative to the conveyor. The second frame lies below the conveyor, when the second frame is in the lowered position relative to the conveyor. The second frame lies proud of the conveyor, when the second frame is in the raised position relative to the conveyor. The conveyor is for conveying a load placed thereon without interference from the second frame, when the second frame is in the lowered position relative to the conveyor. The second frame is for supporting the load placed thereon above the conveyor for disabling the conveyor from conveying the load, when the second frame is in the raised position.

31 Claims, 12 Drawing Sheets

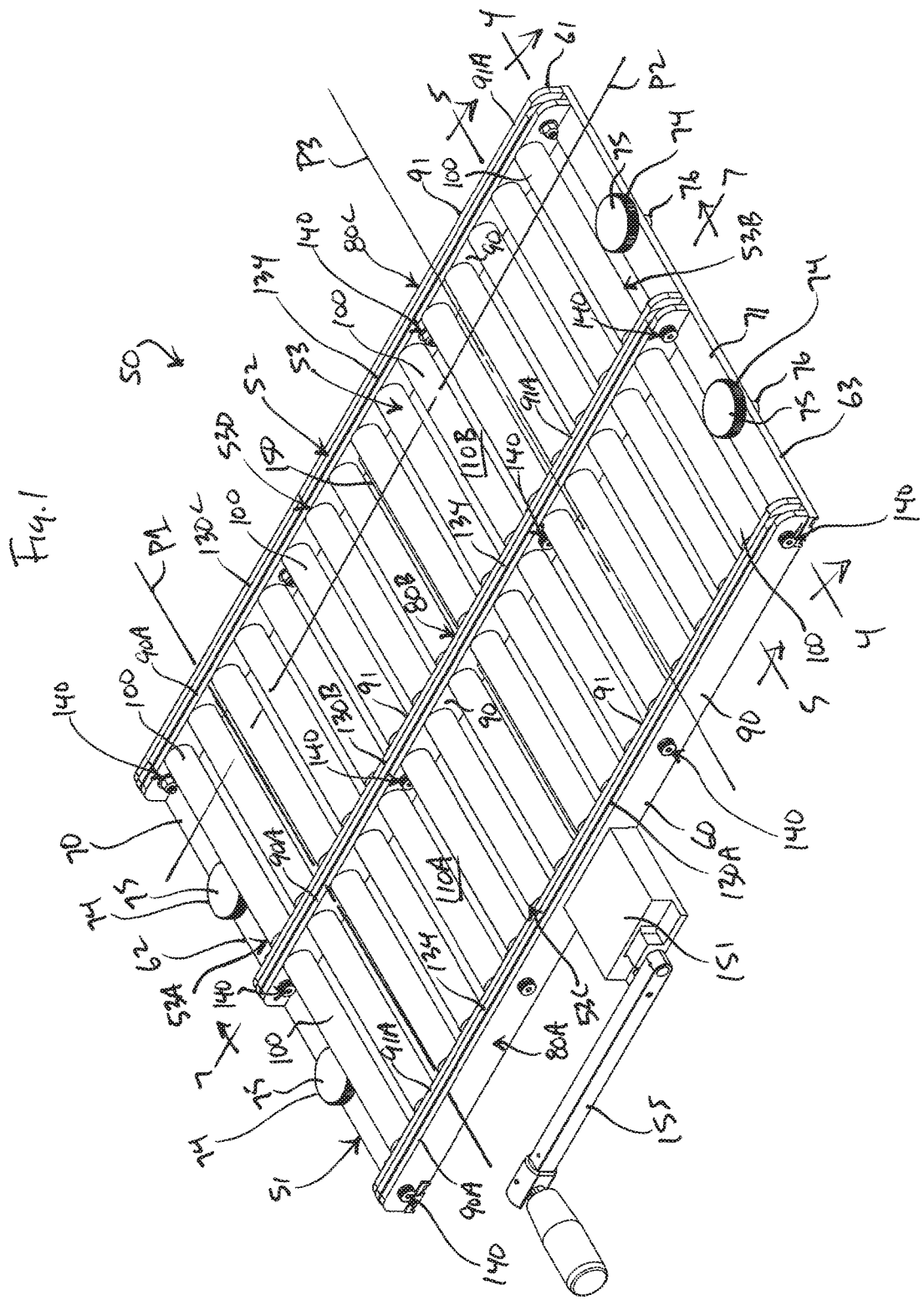

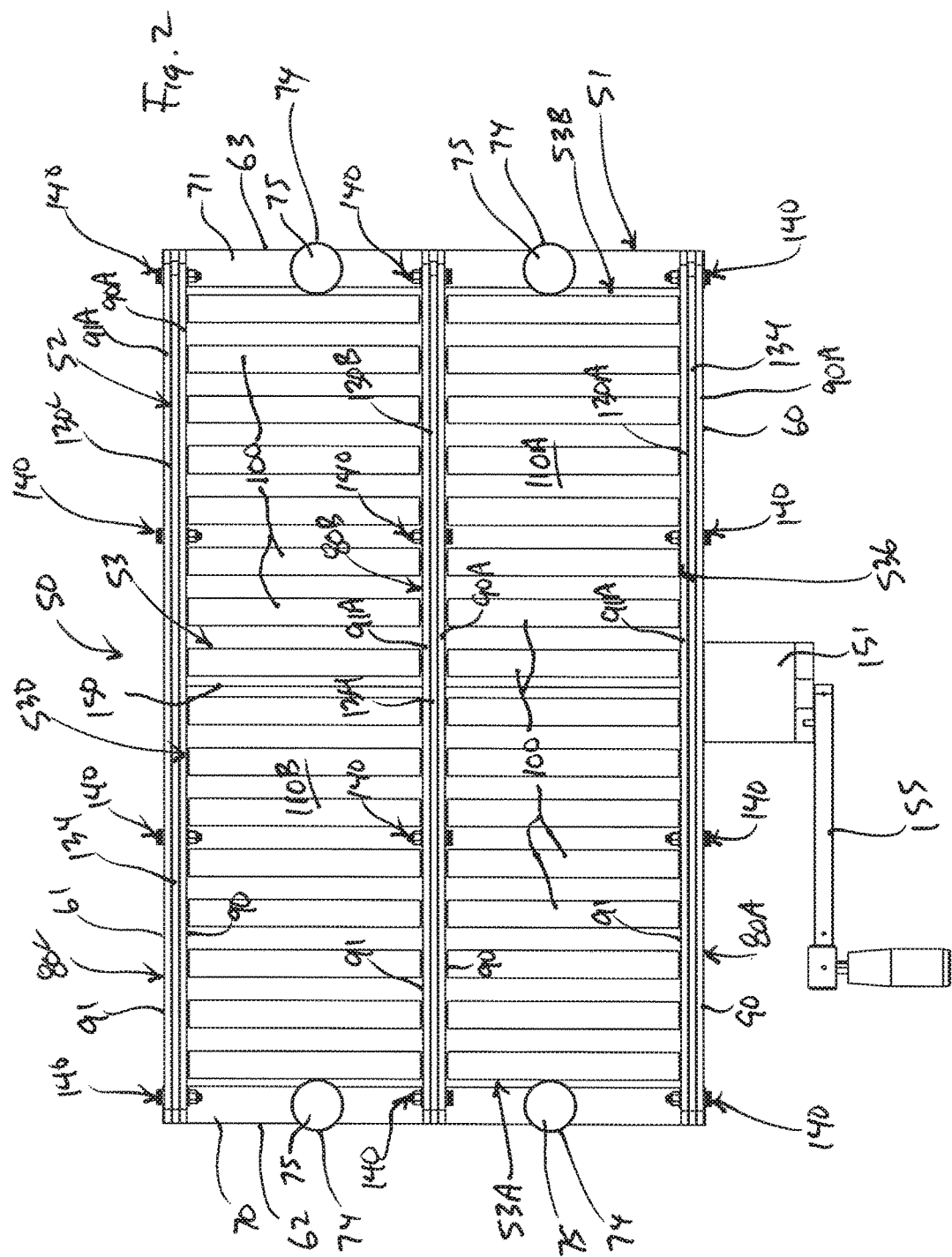

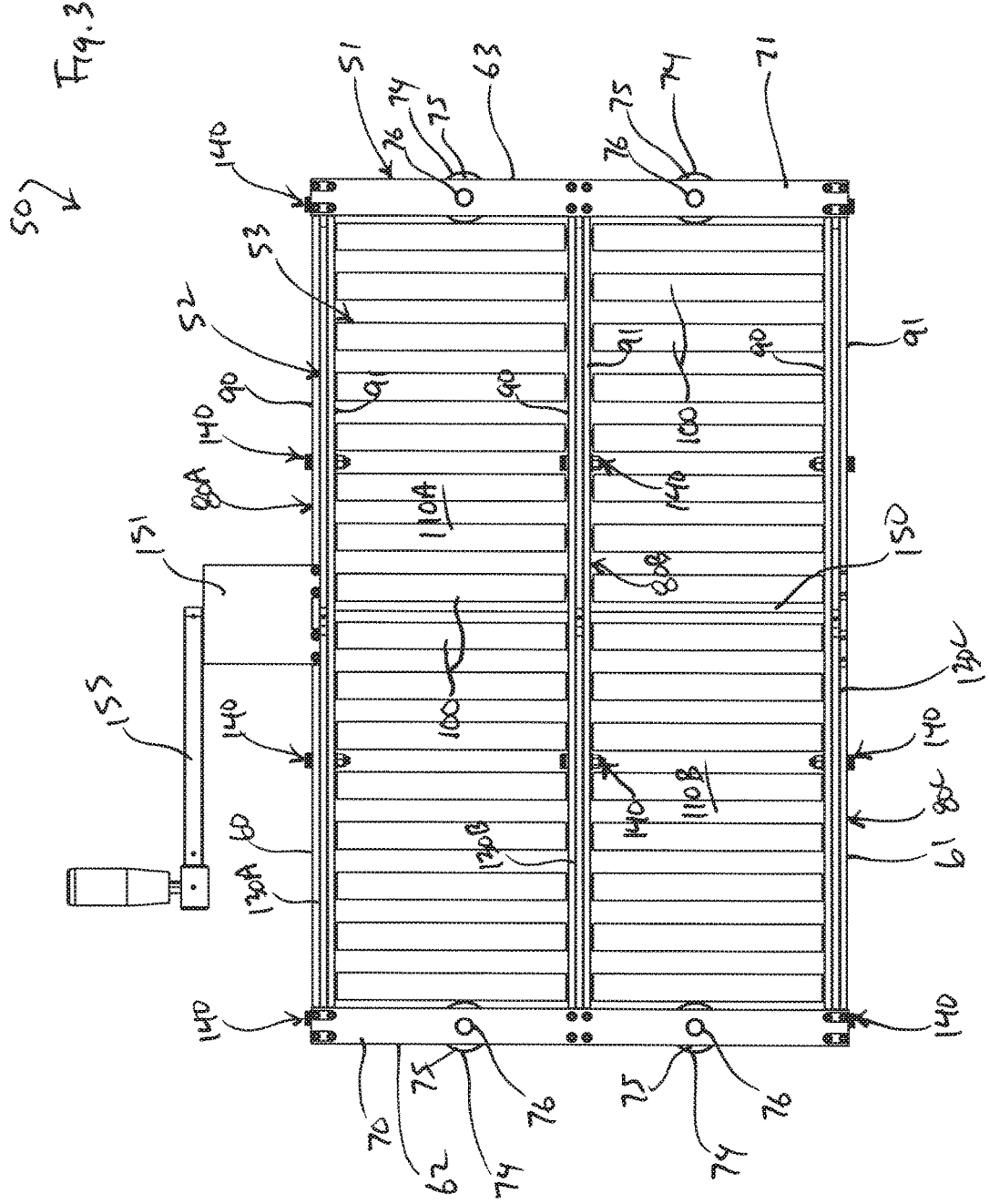

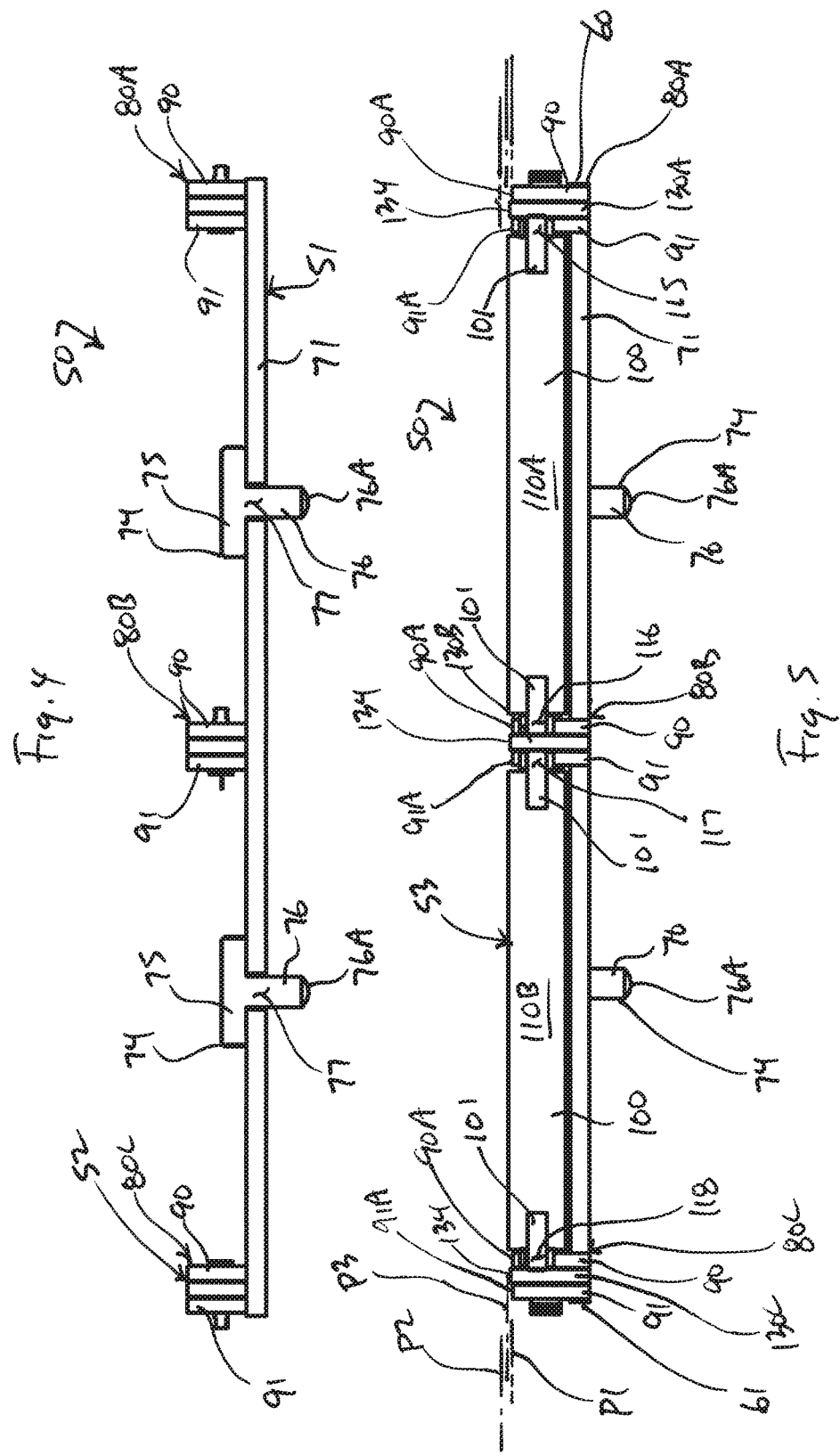

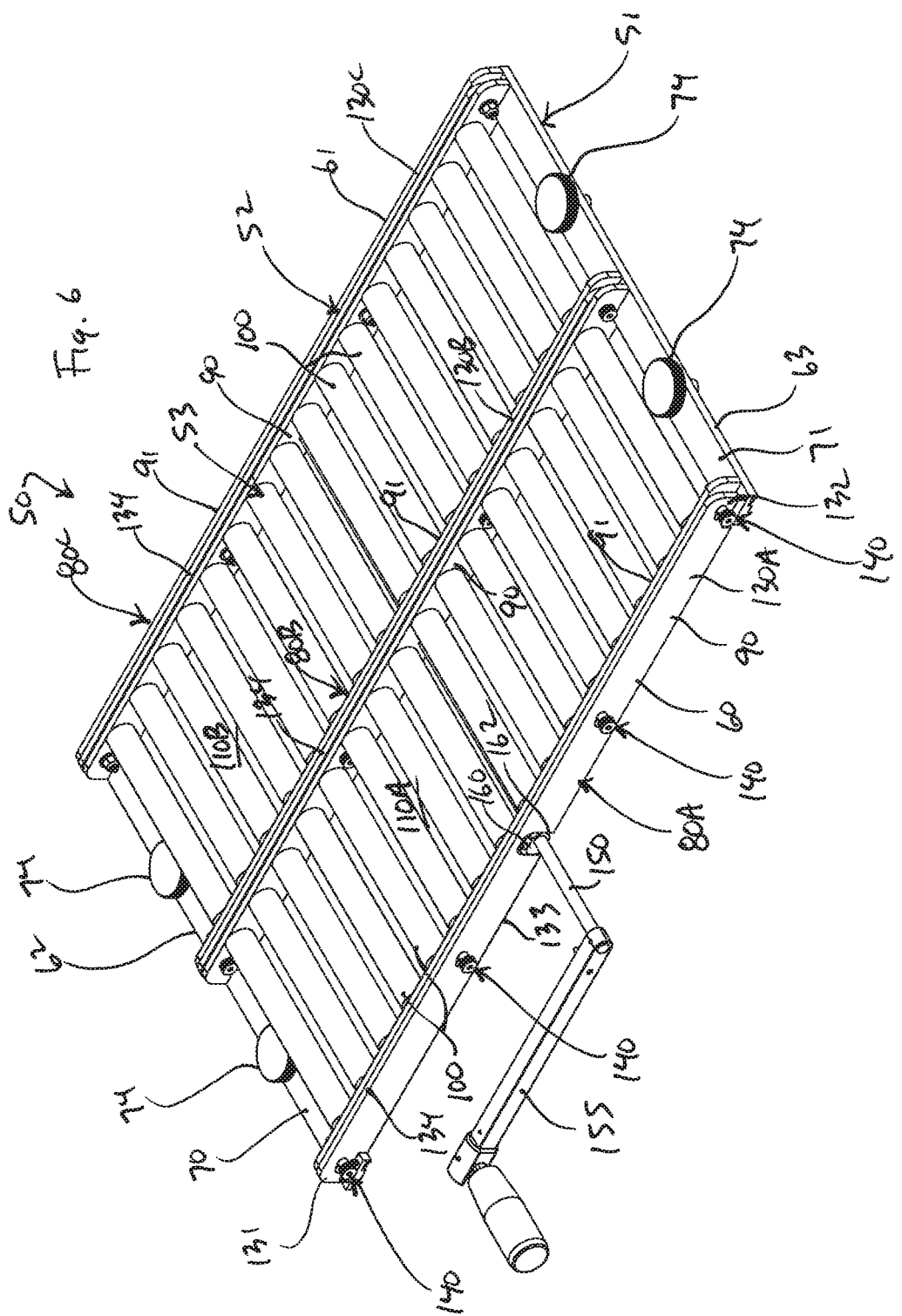

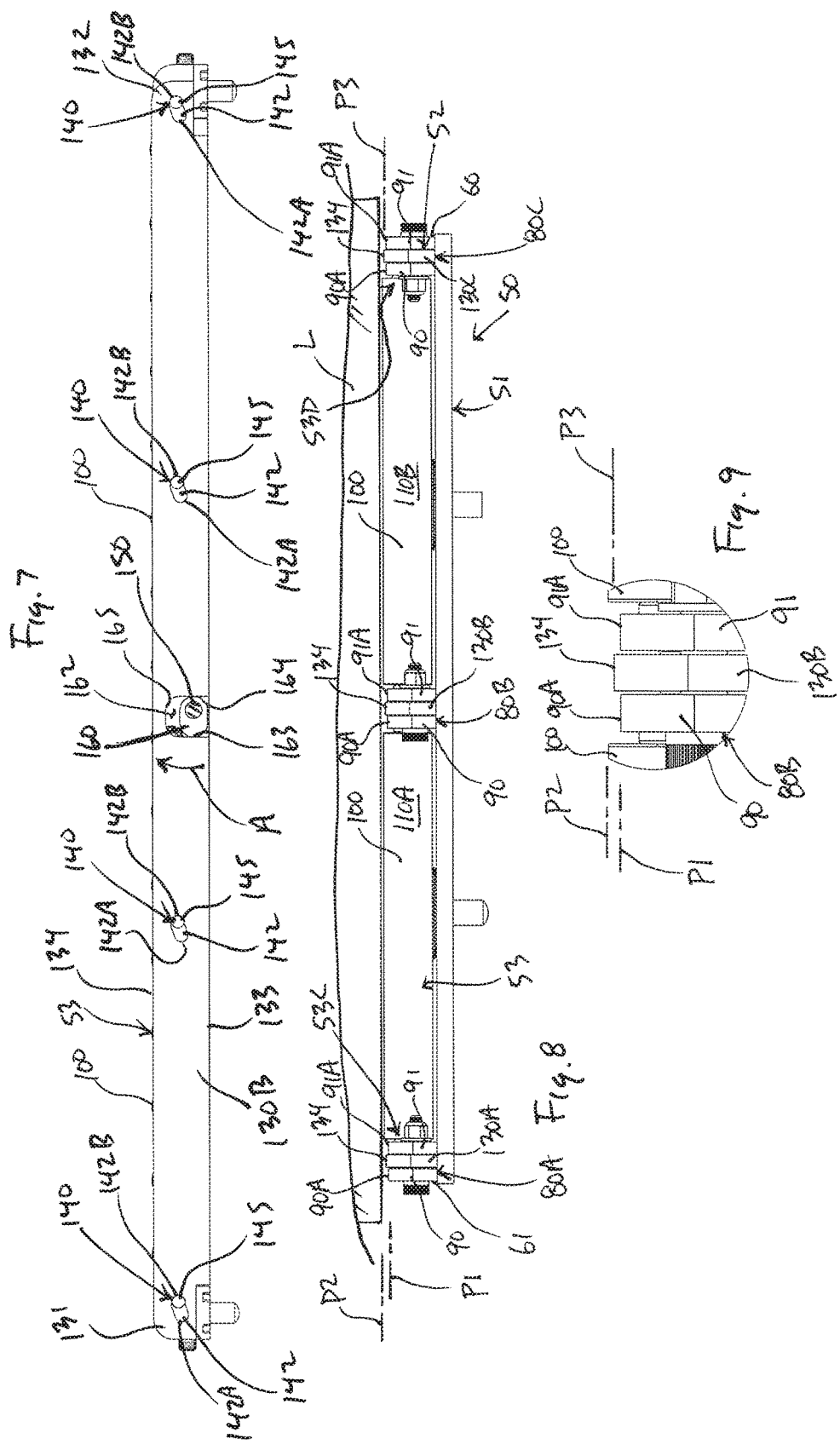

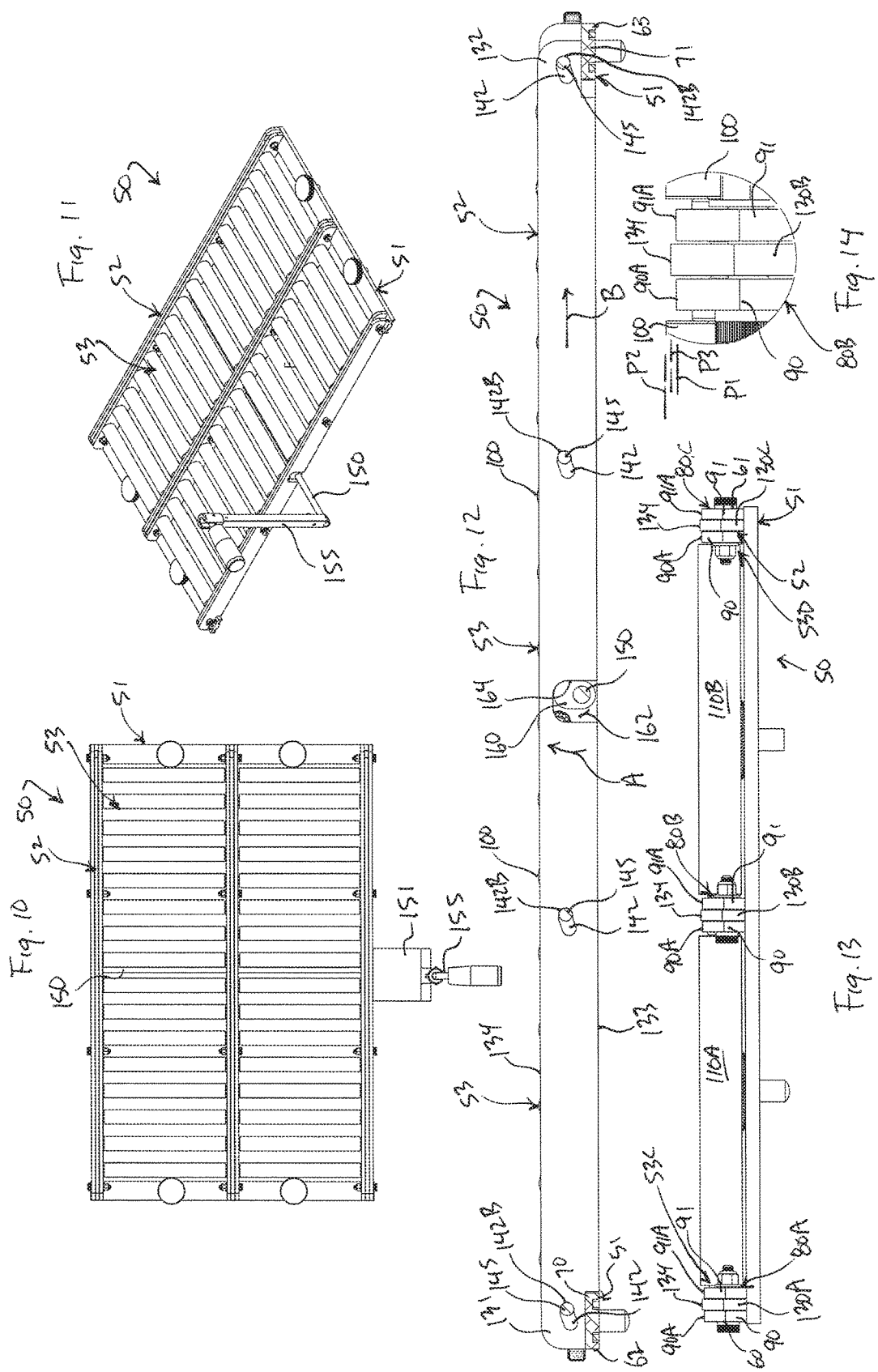

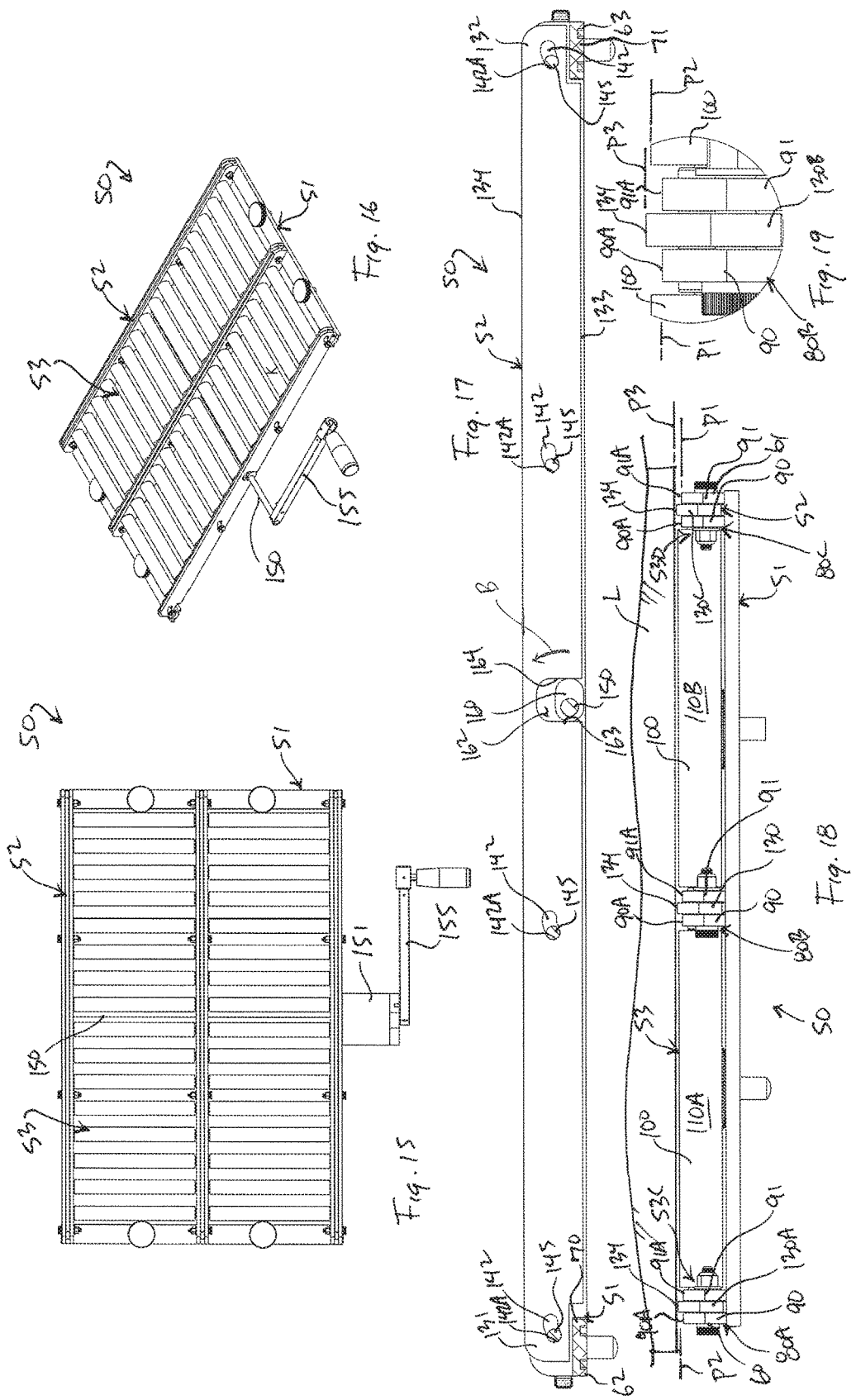

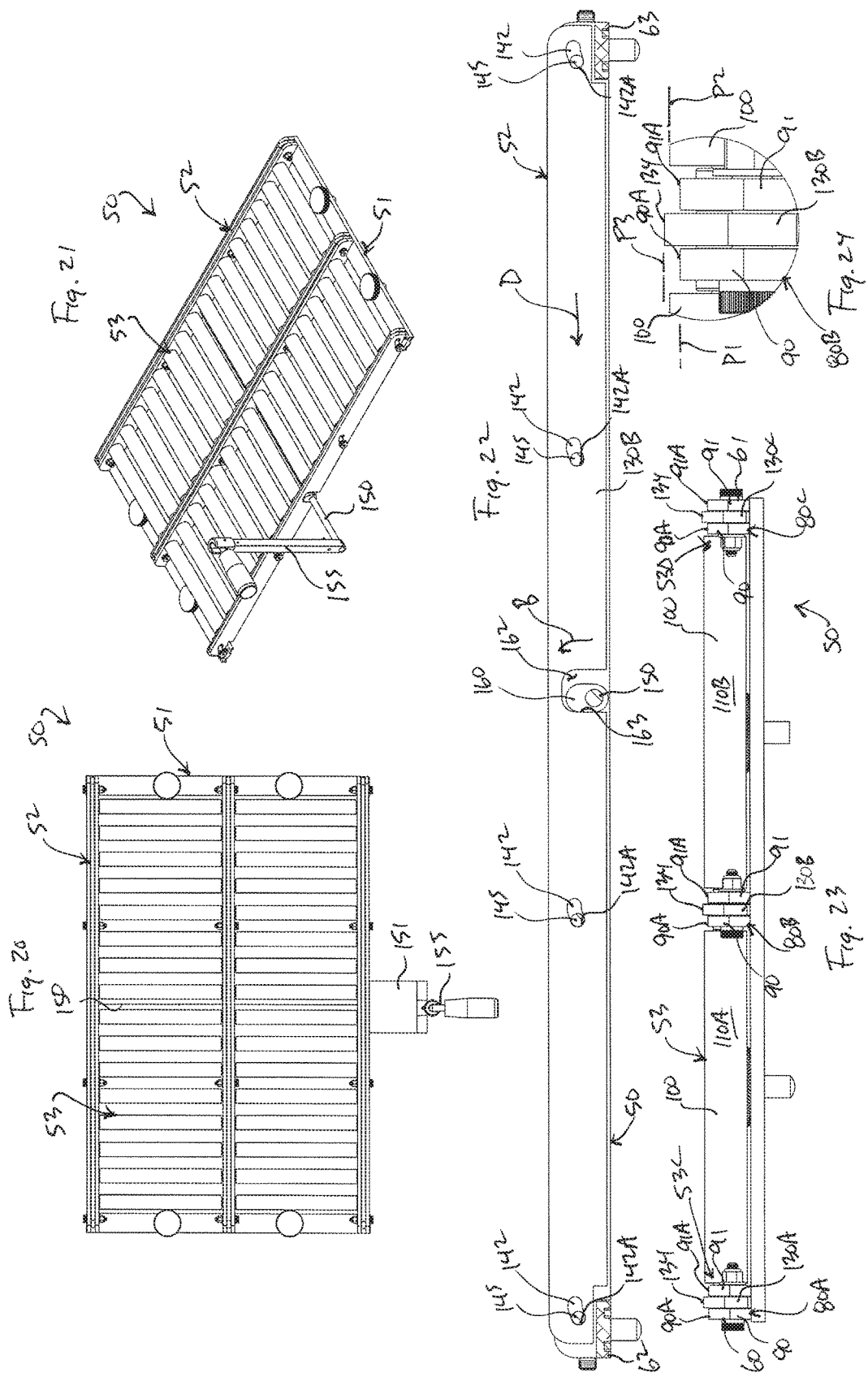

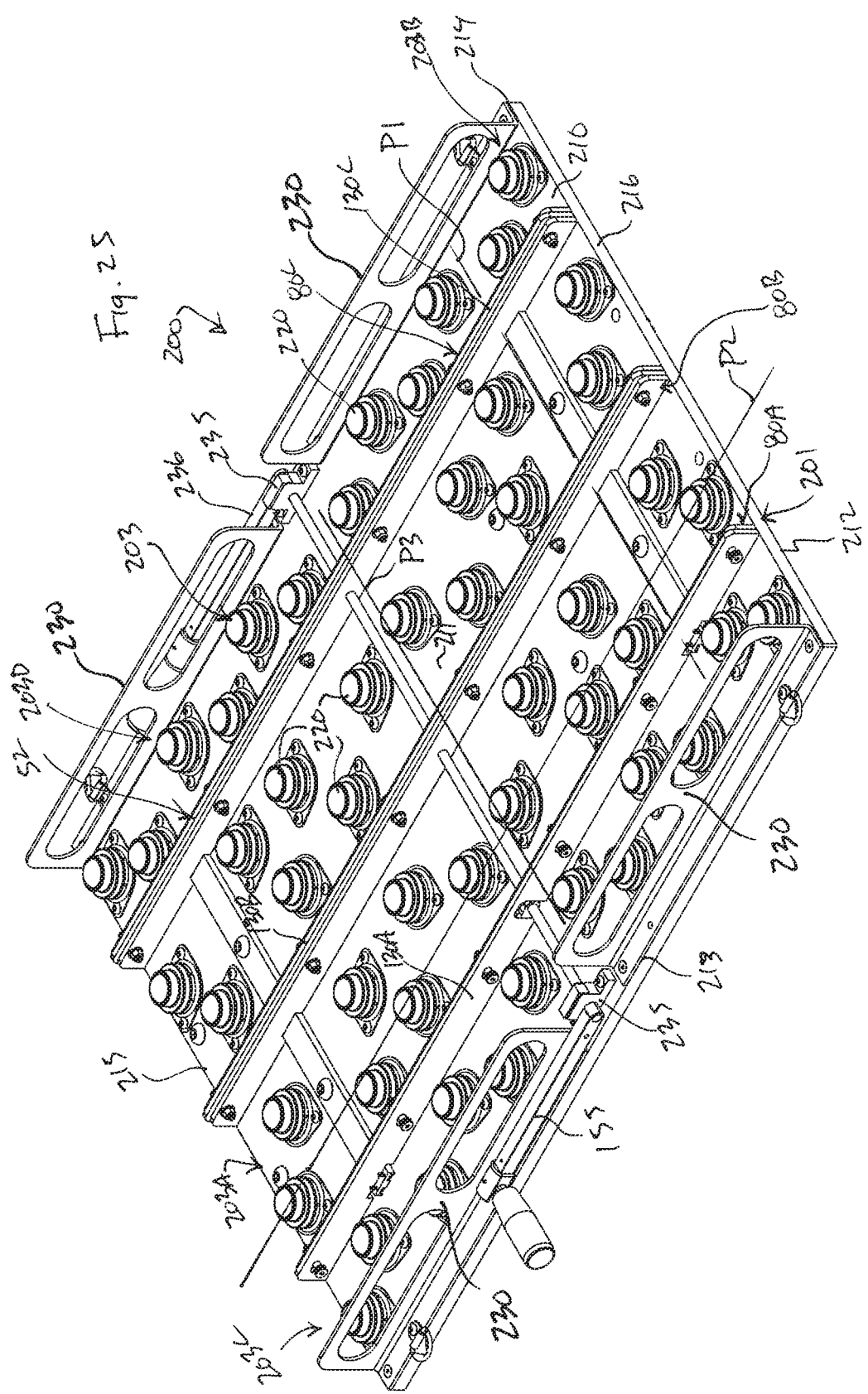

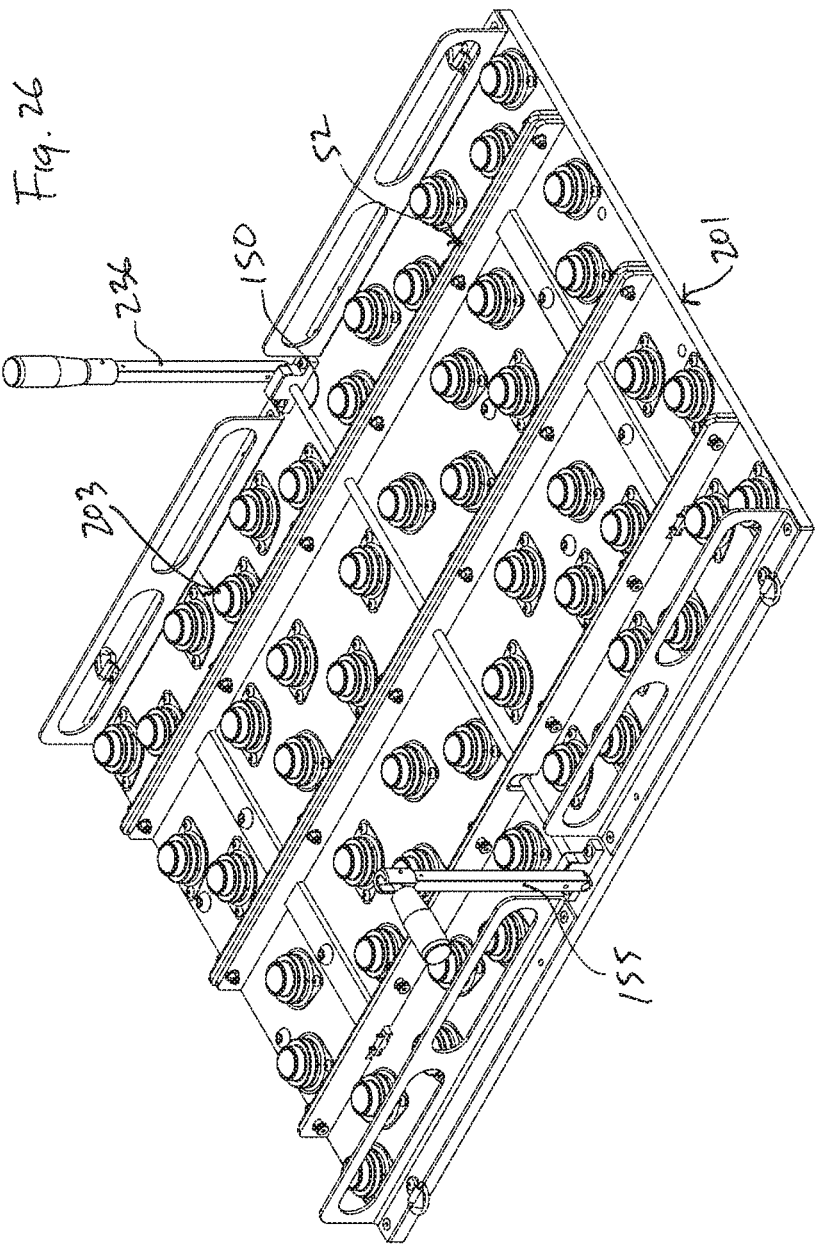

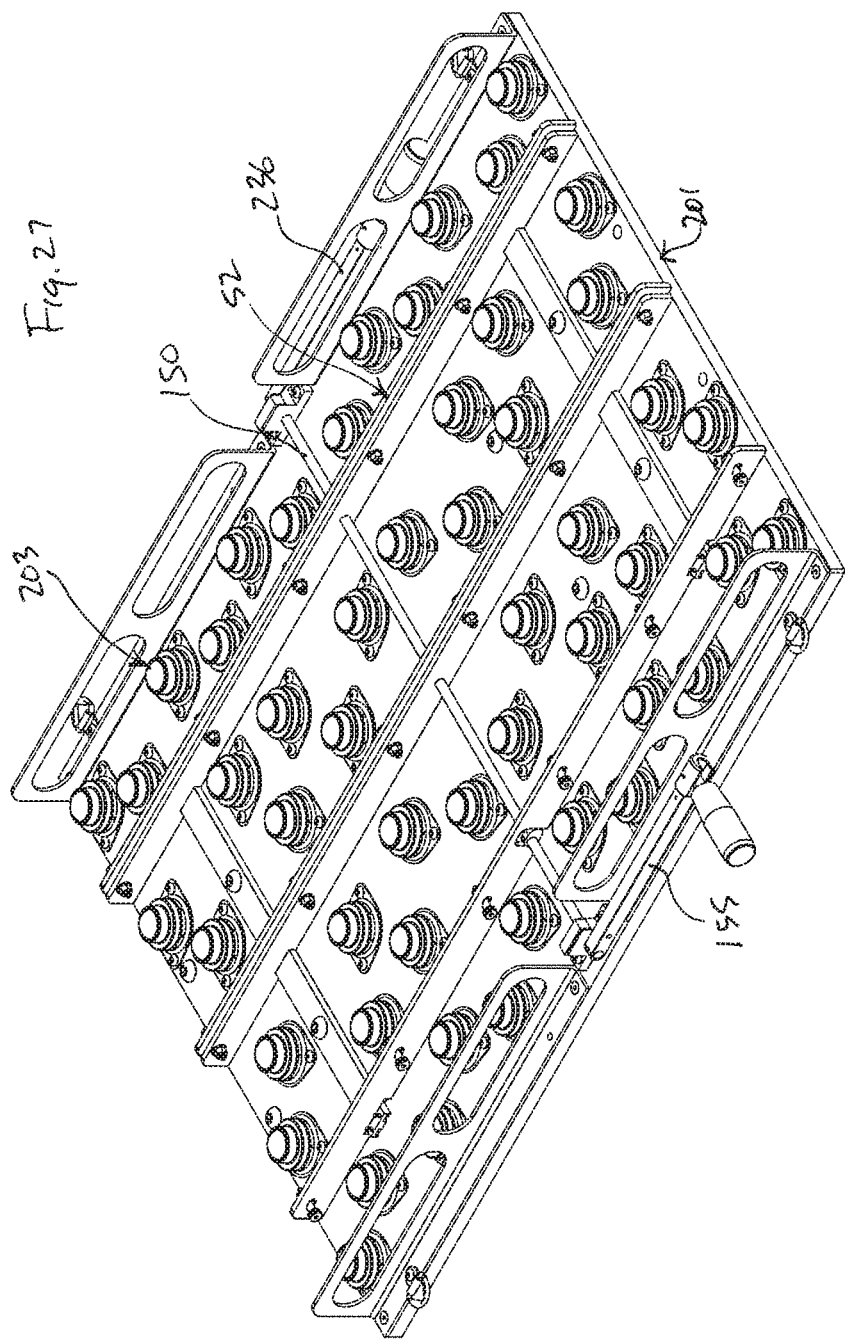

LOAD-CONVEYING AND TRANSPORT APPARATUS AND METHODS

FIELD OF THE INVENTION

The present invention relates to mechanical handling equipment.

BACKGROUND OF THE INVENTION

A conveyor is a mechanical handling apparatus useful for moving loads, such equipment or materials, from one location to another. Typically, a load is applied to an intake end of the conveyor, such as by hand or with a lift or other form of load-handling device. After the load is applied to the conveyor, the conveyor is useful for moving the load from its intake end to its output end where the load is unloaded from the conveyor.

Conveyors are often formed with wheeled motorized and non-motorized vehicles, such as trucks, lifts, and the like. The vehicle is wheeled to a chosen location where the conveyor is used to transfer loads from an offloading location to an uploading location, after which the wheeled vehicle is wheeled away, such as to another location for continued use or to a chosen storage location. In some situations, the uploading location is a transport vehicle used to transport the load to a selected location for subsequent offloading, such as by the previously-used conveyor or another chosen conveyor.

Equipment and materials are routinely moved short distances, such as in warehouses, hardware stores, server facilities, furniture stores, and the like. In these fields, loads are moved about by hand, often at great effort and often with the assistance of hand trucks or wheeled trolleys, or with the assistance of lifts, such as forklifts. Although hand trucks, wheeled trolleys, and forklifts are useful for moving loads short distances, it can be difficult and time consuming to upload and offload loads to and from these implements.

Given these and other deficiencies in the art, there is a need for a load-conveying and transport apparatus that incorporates a conveyor useful for conveying loads placed thereon from one location to another, and that is configured to quickly, easily, and efficiently convert to a pallet, a transport structure that supports loads in a stable fashion while being lifted and moved about.

SUMMARY OF THE INVENTION

According to the principle of the invention, a load-conveying and transport apparatus includes a first frame, a conveyor, and a second frame. The conveyor is carried by the first frame. The second frame is mounted to the first frame for movement between lowered and raised positions relative to the conveyor. The second frame lies below the conveyor, when the second frame is in the lowered position relative to the conveyor. The second frame lies proud of the conveyor, when the second frame is in the raised position relative to the conveyor. The conveyor is for conveying a load placed thereon without interference from the second frame, when the second frame is in the lowered position relative to the conveyor. The second frame is for supporting the load placed thereon above the conveyor for disabling the conveyor from conveying the load, when the second frame is in the raised position. The conveyor has a length that extends from a first end of the conveyor to a second end of the conveyor. The conveyor is for conveying the load placed thereon from the first end of the conveyor to the second end of the conveyor. The second frame has a length that extends along the length of the conveyor from proximate to the first end of the conveyor to proximate to the second end of the conveyor. The length of the second frame from proximate to the first end of the conveyor to proximate to the second end of the conveyor lies below the conveyor, when the second frame is in the lowered position relative to the conveyor. The length of the second frame from proximate to the first end of the conveyor to proximate to the second end of the conveyor lies proud of the conveyor, when the second frame is in the raised position relative to the conveyor. The second frame is mounted to the first frame for movement between the lowered and raised positions with spaced-apart guide assemblies. The guide assemblies each include a pair of relatively reciprocally movable members. One of the pair of reciprocally movable members is a shank received by a cam slot being the other one of the pair of relatively reciprocally movable members. The shank is carried by the first frame. The cam slot is carried by the second frame. The conveyor includes rollers. In one embodiment, the rollers are cylinder rollers. In another embodiment, the rollers are ball rollers. A drive member is mounted rotatably to the first frame. The drive member is operatively coupled to the second frame, whereby rotation of the drive member from a first position to a second position urges corresponding movement of the second frame from the lowered position to the raised position, and rotation of the drive member from the second position to the first position urges corresponding movement of the second frame from the raised position to the lowered position. The drive member is operatively coupled to the second frame with cams carried by the drive member, whereby rotation of the drive member from the first position to the second position rotates the cams against the second frame urging the second frame from the lowered position to the raised position, and rotation of the drive member from the second position to the first position rotates the cams against the second frame urging the second frame from the raised position to the lowered position. A hand crank connected to the drive member is useful rotating the drive member.

According to the principle of the invention, a load-conveying and transport apparatus includes a frame, a conveyor, a first member, a second member, and a third member. The conveyor is carried by the frame and includes opposed first and second sides that extend between opposed first and second ends. The first member is proximate to the first side of the conveyor, the second member is proximate to the second side of the conveyor, and the third member is between the first and second sides of the conveyor. The first member, the second member, and the third member each extend from the first end of the conveyor to the second end of the conveyor. The first member, the second member, and the third member are each mounted to the frame for movement between lowered and raised positions relative to the conveyor. The first member lies below the conveyor proximate to the first side of the conveyor, the second member lies below the conveyor proximate to the second side of the conveyor, and the third member lies below the conveyor between the first and second sides of the conveyor, when the first member, the second member, and the third members are each in the lowered position relative to the conveyor. The first member lies proud of the conveyor proximate to the first side of the conveyor, the second member lies proud of the conveyor proximate to the second side of the conveyor, and the third member lies proud of the conveyor between the first and second sides of the conveyor, when the first member, the second member, and the third members are each in the raised position relative to the conveyor. The conveyor is for conveying a load placed thereon from the first end of the conveyor to the second end of the conveyor without interference from the first member, the second member, and the third member, when the first member, the second member, and the third member are each in the lowered position relative to the conveyor. The first member, the second member, and the third member are for supporting a load placed thereon above the conveyor for disabling the conveyor from conveying the load from the first end of the frame to the second end of the frame, when the first member, the second member, and the third member are each in the raised position relative to the conveyor. The first member, the second member, and the third member are each mounted to the frame for movement between the lowered position and the raised position with spaced-apart guide assemblies. The guide assemblies each include a pair of relatively reciprocally movable members. One of the pair of reciprocally movable members is a shank received by a cam slot being the other one of the pair of relatively reciprocally movable members. The shanks are carried by the frame. The cam slots are carried by the second frame. The conveyor includes rollers. In one embodiment, the rollers are cylinder rollers. In another embodiment, the rollers are ball rollers. A drive member is mounted rotatably to the frame. The drive member is operatively coupled to the first member, the second member, and the third member, whereby rotation of the drive member from a first position to a second position urges corresponding concurrent movement of the first member, the second member, and the third member from the lowered positions to the raised positions, and rotation of the drive member from the second position to the first position urges corresponding concurrent movement of the first member, the second member, and the third member from the raised positions to the lowered positions. The drive member is operatively coupled to the first member, the second member, and the third member with a first cam, a second cam, and a third cam respectively, whereby rotation of the drive member from the first position to the second position rotates the first cam, the second cam, and the third cam against the first member, the second member, and the third member, respectively, urging the first member, the second member, and the third member from the lowered positions to the raised positions, and rotation of the drive member from the second position to the first position rotates the first cam, the second cam, and the third cam against the first member, the second member, and the third member, respectively, urging the first member, the second member, and the third member from the raised positions to the lowered. A hand crank connected to the drive member is useful for rotating the drive member. The first member, the second member, and the third member are parallel relative to one another.

BRIEF DESCRIPTION OF THE DRAWINGS

Referring to the drawings:

FIG. 1 is a perspective view of a load-conveying and transport apparatus constructed and arranged in accordance with the principle of the invention, the load-conveying and transport apparatus includes a first frame, a conveyor, cylinder rollers in this embodiment, carried by the first frame, a second frame mounted to the first frame for movement between lowered and raised positions relative to the conveyor, a drive member mounted rotatably to the first frame and operatively coupled to the second frame, whereby rotation of the drive member urges corresponding movement of the second frame between the lowered and raised positions, and a hand crank connected to the drive member for imparting rotation to the drive member when the hand crank is moved between lowering and raising positions by hand, and a crank support coupled between the first frame and the hand crank;

FIG. 2 is a top plan view of the embodiment of FIG. 1;

FIG. 3 is a bottom plan view of the embodiment of FIG. 1;

FIG. 4 is a section view taken along line 4-4 of FIG. 1;

FIG. 5 is a section view taken along line 5-5 of FIG. 1;

FIG. 6 is a view corresponding to FIG. 1 illustrating the load-conveying and transport apparatus without the crank support to better illustrate the drive member;

FIG. 7 is a section view taken along line 7-7 of FIG. 1 illustrating a member of the second frame in a lowered position relative to the conveyor corresponding to a lowering position of the hand crank in FIG. 1;

FIG. 8 is an end elevation view of the embodiment of FIG. 1;

FIG. 9 is an enlarged, fragmentary end elevation view corresponding to FIG. 7 illustrating the member of the second frame in the lowered position relative to a portion of the conveyor;

FIG. 10 is a top plan view of the embodiment of FIG. 1 showing the hand crank displaced from the lowering position in FIG. 1 to an intermediate position;

FIG. 11 is a perspective view corresponding to the embodiment of FIG. 10 without the crank support;

FIG. 12 is a section view taken along line 12-12 of FIG. 10 illustrating a member of the second frame in a lowered position relative to the conveyor corresponding to the intermediate position of the hand crank in FIGS. 10 and 11;

FIG. 13 is an end elevation view of the embodiment of FIG. 10;

FIG. 14 is an enlarged, fragmentary end elevation view corresponding to FIG. 12 illustrating the member of the second frame in the lowered position relative to a portion of the conveyor;

FIG. 15 is a top plan view of the embodiment of FIG. 1 showing the hand crank displaced from the intermediate position in FIG. 10 to the raising position;

FIG. 16 is a perspective view corresponding to the embodiment of FIG. 15 without the crank support;

FIG. 17 is a section view taken along line 17-17 of FIG. 15 illustrating a member of the second frame in a raised position relative to the conveyor, which is concealed by the member of the second frame in FIG. 17, corresponding to the raising position of the hand crank in FIGS. 15 and 16;

FIG. 18 is an end elevation view of the embodiment of FIG. 15;

FIG. 19 is an enlarged, fragmentary end elevation view corresponding to FIG. 17 illustrating the member of the second frame in the raised position relative to a portion of the conveyor;

FIG. 20 is a top plan of the embodiment of FIG. 1 showing the hand crank displaced from its raising position in FIGS. 15 and 16 to an intermediate position;

FIG. 21 is a perspective view corresponding to the embodiment of FIG. 20 without the crank support;

FIG. 22 is a section view taken along line 22-22 of FIG. 20 illustrating a member of the second frame in a raised position relative to the conveyor, which is concealed by the member of the second frame in FIG. 22, corresponding to the intermediate position of the hand crank in FIGS. 20 and 21;

FIG. 23 is an end elevation view of the embodiment of FIG. 20;

FIG. 24 is an enlarged, fragmentary end elevation view corresponding to FIG. 22 illustrating the member of the second frame in the raised position relative to a portion of the conveyor;

FIG. 25 is a perspective view of an alternate embodiment of a load-conveying and transport apparatus constructed and arranged in accordance with the principle of the invention, the load-conveying and transport apparatus includes a first frame, a conveyor, ball rollers in this embodiment, carried by the first frame, a second frame mounted to the first frame for movement between lowered and raised positions relative to the conveyor, a drive member mounted rotatably to the first frame and operatively coupled to the second frame, whereby rotation of the drive member urges corresponding movement of the second frame between the lowered and raised positions, and hand cranks connected to either end of the drive member for imparting rotation to the drive member when the hand cranks are moved between lowering and raising positions by hand;

FIG. 26 is a view corresponding to FIG. 25 showing the hand cranks displaced from their lowering positions in FIG. 25 to intermediate positions; and FIG. 27 is a view corresponding to FIG. 26 showing the hand cranks displaced from their intermediate positions in FIG. 26 to raising positions.

DETAILED DESCRIPTION

Turning now to the drawings, in which like reference characters indicate corresponding elements throughout the several views, attention is directed to FIG. 1 illustrating load-conveying and transport apparatus 50 including frames 51 and 52, and conveyor 53. For reference purposes, frame 51 is a first frame, and frame 52 is a second frame 52. Conveyor 53 is carried by frame 51. Second frame 52 is mounted to first frame 51 for movement between a lowered position relative to conveyor 53 and first frame 51 in FIGS. 1, 7, and 8, and a raised position relative to conveyor 53 and first frame 51 in FIG. 18. Second frame 52 lies below conveyor 53, when second frame 52 is in the lowered position relative to conveyor 53. Second frame 52 lies proud of conveyor 53, when second frame 52 is in the raised position relative to conveyor 53. Conveyor 53 is operable for conveying a load placed thereon from one location to another, from one end of conveyor 53 proximate to one end of first frame 51 to another end of conveyor 53 proximate to another end of first frame 51, without interference from second frame 52, when second frame 52 is in the lowered position relative to conveyor 53. Second frame 52 is for supporting the load placed thereon above conveyor 53 for relieving conveyor 53 of the load for disabling conveyor 53 from conveying the load while at the same time securing the load relative to conveyor 53 in a stable fashion, like a pallet, when second frame 52 is in the raised position. When second frame 52 is in its lowered position, conveyor 53 is enabled to convey a load placed thereon, for load onloading and offloading, without interference from second frame 52. When second frame 52 is in its raised position, second frame 52 is enabled to hold a load placed thereon above conveyor 53 and support the load in a stable fashion. Apparatus 50 is in a "conveying" configuration, when second frame 52 is in its lowered position relative to conveyor 53. Apparatus 50 is in a transport or "pallet" configuration, when second frame 52 is in its raised position relative to conveyor 53. When second frame 52 is in its lowered position relative to conveyor 53 and a load is placed atop conveyor 53 over second frame 52 and second frame 52 is moved from its lowered position relative to conveyor 53 to its raised position relative to conveyor 53, second frame 52 lifts the load upwardly away from conveyor 53 disabling conveyor 53 from interacting conveyingly with the load. When second frame 52 is in its raised position and a load is placed atop second frame 52 and second frame 52 is moved from its raised position to its lowered position, second frame 52 lowers the load downwardly atop conveyor 53 for enabling conveyor 53 to interact conveyingly with the load.

Apparatus 50 is a flat load-conveying and transport assembly. In FIGS. 1, 2, and 3, first frame 51 is fashioned of metal, such as steel or aluminum, or other equivalent strong, durable material, is rectangular in overall shape, and includes opposed parallel sides 60 and 61 that extend between opposed parallel ends 62 and 63. Sides 60 and 61 are equal in length and ends 62 and 63 are equal in length. The length of each one of sides 60 and 61 is greater than the length of each of ends 62 and 63, characterizing the overall rectangular shape of first frame 51.

Ends 62 and 63 of first frame 51 are defined by opposed, parallel members 70 and 71, which are flat, elongate, and equal in size and shape. Members 70 and 71 are identical in size and shape and each incorporate opposed, identical keepers or retainers 74, which are useful for releasably stabilizing first frame 51 atop a platform or fixture onto which first frame 51 is set upon. When the platform or fixture onto which first frame 51 is set upon is part of a lift, such as a forklift, a pallet jack, or the like, and retainers 74 are releasably retained by such platform or fixture, apparatus 50 is supported in a stable fashion while being lifted and moved about by the lift, the forklift, the pallet jack, or the like. Retainers 74 are spaced apart, and are between sides 60 and 61. In FIG. 4, each retainer 74 of member 71 includes a head 75, a circular disk in this example, and a central pin 76 that depends downwardly from the underside of circular head 75. The respective undersides of heads 75 are situated atop the upper side of member 71. Pins 76 depend downwardly from the respective undersides of heads 75 through corresponding holes 77 through member 71 and downwardly from the underside of member 71 to free ends 76A, which can be inserted into corresponding sockets, holes, or receiving areas formed in the platform or fixture onto which first frame 51 is situated. Retainers 74 are not affixed to member 71. Rather, retainers 74 are releasably carried by member 71, which enables retainers 74 to be taken up by their heads 75 and selectively withdrawn from member 71 away from the upper side member 71 for withdrawing shanks 76 from the respective holes 77, and then selectively re-installed. Retainers 74 of member 70 are identical to retainers 74 of member 71, and the foregoing discussion of retainers 74 of member 71 applies in every respect to retainers 74 of member 70. First frame 51 incorporates four retainers 74 in this embodiment, two with member 70 and two with member 71.

First frame 51 further includes spaced-apart, parallel supports 80 including, from side 60 to side 61, side support 80A at side 60, intermediate support 80B between sides 60 and 61, and side support 80C at side 61, which rigidly connect member 70 to member 71. In this example, supports 80 rigidly connect the upper sides of members 70 and 71. Supports 80 are perpendicular relative to members 70 and 71, and are rigidly connected to the upper sides of members 70 and 71, respectively, via welding, and nut-and-bolt assemblies, rivets, or other equivalent mechanical fastening can be used in alternate embodiments. Supports 80 are elongate and straight. Side support 80A extends between corresponding first ends of members 70 and 71, respectively, and extends along, and defines, side 60 of first frame 51. Side support 80C extends between corresponding second ends of members 70 and 71, respectively, and extends along, and defines, side 61 of first frame 51. Intermediate support 80B, is between and equidistant with respect to side supports 80A and 80C, and extends between the corresponding middles of members 70 and 71. One retainer 74 of member 70 is between, and equidistant with respect to, the ends of supports 80A and 80B rigidly affixed to member 70, and the other retainer 74 of member 70 is between, and is equidistant with respect to, the ends of supports 80B and 80C rigidly affixed to member 70. One retainer 74 of member 71 is between, and equidistant with respect to, the ends of supports 80A and 80B rigidly affixed to member 71, and the other retainer 74 of member 71 is between, and is equidistant with respect to, the ends of supports 80B and 80C rigidly affixed to member 71.

Supports 80 are identical in every respect, each being opposed, spaced-apart, parallel rails 90 and 91. Rails 90 and 91 are elongate and straight, are sized and shaped identically, and extend upright from the upper sides of the respective members 70 and 71 to upper edges 90A and 91A in FIG. 1, which are parallel. Edges 90A and 91A of supports 80 extend from end member 70 at end 62 of first frame 51 to end member 71 at end 63 of first frame 51, and reside in a common horizontal plane P1 in FIG. 1.

In FIGS. 1, 2, and 3, conveyor 53 includes rollers 100. In this embodiment, rollers 100 are identical cylinder rollers of metal, such as steel or aluminum, or other equivalent strong, durable material. There are two sets of rollers 100 in apparatus 50, including one set 110A of rollers 100 is supported by and between rail 91 of side support 80C and rail 90 of intermediate support 80B, and an identical set 110B of rollers 100 is supported by and between rail 91 of intermediate support 80B and rail 90 of side support 80C.

Rollers 100 of set 110A are spaced-apart and parallel relative to each other and to members 70 and 71, are perpendicular relative to supports 80, and extend axially between, and are rotated identically to, rail 91 of side support 80A and rail 90 of intermediate support 80B for rotation along parallel axes of rotation that are parallel relative to members 70 and 71 and to ends 62 and 63 of first frame 51, and that are perpendicular relative to supports 80 and to sides 60 and 61 of first frame 51. In FIG. 5, shafts 101 at either end of each roller 100 of set 110A are journaled to opposed openings 115 and 116, respectively, in rail 91 of side support 80A and rail 90 of intermediate support 80C. Identically, rollers 100 of set 110B are spaced-apart and parallel relative to each other and to members 70 and 71, are perpendicular relative to supports 80, and extend axially between, and are rotated identically to, rail 91 of intermediate support 80B and rail 90 of side support 80C for rotation along parallel axes of rotation that are parallel relative to members 70 and 71 and to ends 62 and 63 of first frame 51, and that are perpendicular relative to supports 80 and to sides 60 and 61 of first frame 51. In FIG. 5, shafts 101 at either end of each roller 100 of set 110B are journaled to opposed openings 117 and 118, respectively, in rail 91 of intermediate support 80B and rail 90 of side support 80C.

Rollers 100 define conveyor 53, which is roller conveyor. The number of rollers 100 in set 110A is equal to the number of rollers 100 in set 110B. Rollers 100 in set 110A are axially aligned with the corresponding rollers 100 in set 110B, in which each axially-aligned pair of rollers 100 of sets 110A and 110B share an axis of rotation. The pair of endmost rollers 100 of sets 110A and 110B proximate to member 70 define one end 53A of conveyor 53 inboard of member 70 proximate to 62 of first frame 51, the pair of endmost rollers 100 of sets 110A and 110B proximate to member 71 define the opposite other end 53B of conveyor 53 inboard of member 71 proximate to end 63 of first frame 51, the ends of rollers 100 of set 110A rotated to rail 91 of side support 80A define one side 53C of conveyor 53 inboard of rail 91 of side support 80C proximate to side 60 of first frame 51, and the ends of rollers 100 of set 110B rotated to rail 90 of side support 80C define the opposite one side 53C of conveyor 53 inboard of rail 90 of side support 80C proximate to side 61 of first frame 51. End 53A of conveyor 53 extends from side support 80A to side support 80C, end 53B of conveyor 53 extends from side support 80A to side support 80C, side 53C of conveyor 53 extends along rail 91 of side support 80A proximate to side 60 of first frame 51 from end 53A of conveyor 53 to end 53B of conveyor 53, and side 53D of conveyor 53 extends along rail 90 of side support 80C proximate to side 61 of first frame 51 from end 53A of conveyor 53 to end 53B of conveyor 53. Conveyor 53 extends between end 53A and 53B thereof.

Rollers 100 are for conveying a load placed thereon linearly from one location to another, whether from end 53A of conveyor 53 proximate to end 62 of first frame 51 to end 53B of conveyor 53 proximate to end 63 of first frame 51 or from end 53B of conveyor 53 proximate to end 63 of first frame 51 to end 53A of conveyor 53 proximate to end 62 of first frame 51. Rollers 100 extend slightly above plane P1 of first frame 51 to a load-conveying plane P2 in FIG. 5 where the load placed on rollers 100 resides when the load is placed atop rollers 100 for being conveyed thereby. In FIGS. 5 and 8, load-conveying plane P2 is parallel to plane P1 of first frame 51 and lies proud of plane P1 of first frame 51, meaning that load-conveying plane P2, the uppermost plane through which rollers 100 rotate, lies slightly above plane P2 of first frame 51, which enables rollers 100 to convey a load placed thereon along load-conveying plane P2 without interference from first frame 51, including supports 80.

Second frame 52 includes, and is defined by, spaced-apart, parallel members 130 including, from side 60 to side 61, side member 130A mounted to side support 80A of first frame 51 for movement between lowered and raised positions relative to conveyor 53, intermediate member 130B mounted to intermediate support 80B of first frame 51 for movement between lowered and raised positions relative to conveyor 53, and side member 130C mounted to side support 80C of first frame 51 for movement between lowered and raised positions relative to conveyor 53. Intermediate member 130B mounted to intermediate support 80B is between, and is equidistant with respect to, side member 130A mounted to side support 80A and side member 130C mounted to side support 80C. Members 130 work in concert with one another, and are each fashioned of metal, such as steel or aluminum, or other equivalent strong, durable material. In FIGS. 8 and 13, side member 130A lies below conveyor 53, meaning below plane P2 of conveyor 53, proximate to side 53C of conveyor 53 from end 53A of conveyor 53 to end 53B of conveyor 53 in FIG. 1, when side member 130A is in its lowered position, side member 130C lies below conveyor 53, meaning below plane P2 of conveyor 53, proximate to side 53D of conveyor 53 from end 53A of conveyor 53 to end 53B of conveyor 53, when side member 130C is in its lowered position, and intermediate member 130B below conveyor 53, meaning below plane P2 of conveyor 53, between sides 53C and 53D of conveyor 53 from end 53A of conveyor 53 to end 53B of conveyor 53, when intermediate member 130B is in its lowered position. Conveyor 53 is for conveying a load L placed thereon in FIG. 8, the load L extending across conveyor 53 and over members 130 from side 60 of first frame 51 to side 61 of first frame 51, along load-conveying plane P2 without interference from members 130, when members 130 are concurrently in their lowered positions defining the conveying configuration of apparatus 50. In FIG. 18, side member 130A lies proud of conveyor 53, meaning above plane P2 of conveyor 53, proximate to side 53C of conveyor 53 from end 53A of conveyor 53 to end 53B of conveyor 53, when side member 130A is in its raised position, side member 130C lies proud of conveyor 53, meaning above plane P2 of conveyor 53, proximate to side 53D of conveyor 53 from end 53A of conveyor 53 to end 53B of conveyor 53, when side member 130C is in its raised position, and intermediate member 130B proud of conveyor 53, meaning above plane P2 of conveyor 53, between sides 53C and 53D of conveyor 53 from end 53A of conveyor 53 to end 53B of conveyor 53, when intermediate member 130B is in its raised position. Members 130 are for supporting the load L placed thereon, the load L extending from over members 130 from side 60 of first frame 51 to side 61 of first frame 51 from side member 130A and across intermediate member 130B to side member 130C, above conveyor 53 in FIG. 23, meaning above plane P2 of conveyor 53, for relieving conveyor 53 of the load L for disabling conveyor 53 from conveying the load L while at the same time securing the load L frictionally in a stable fashion relative to conveyor 53, when members 130 are concurrently in their raised positions defining the "pallet" configuration of apparatus 50. With the load L secured atop members 130 when members 130 are in their raised positions, apparatus 50 and load L supported by second frame 52 in a stable fashion can be concurrently transported for transporting load L to a chosen location for unloading, at which point members 130 can be moved from their raised positions to their lowered positons lowering load L back onto conveyor 53 for enabling conveyor to convey load L, such as for offloading the load to a chosen location from conveyor 53.

Members 130 are parallel with respect to rails 90 and 91 of supports 80, and thusly to supports 80, and are perpendicular with respect to end members 70 and 71 and to rollers 100. Side member 130A, intermediate member 130B, and side member 130C are identical in every respect, and are incorporated identically with side support 80A, intermediate support 80B, and side support 80C, respectively. Accordingly, the details of intermediate member 130B with intermediate support 80B will now be discussed, with the understanding that the ensuing discussion of intermediate member 130B with intermediate support 80B applies in every respect to side member 130A with side support 80A, and to side member 130C with side support 80C.

In FIGS. 1, 8, and 9, intermediate member 130B is situated between rails 90 and 91 of intermediate support 80B, and extends along approximately the entire length of rails 90 and 91 of intermediate support 80B from end member 70 at end 62 of first frame 51 to end member 71 at end 63 of first frame 51, as shown in FIGS. 1 and 8. In FIG. 7, intermediate member 130B is elongate and straight and includes opposed ends 131 and 132, and opposed lower and upper edges 133 and 134 that extend from end 131 at member 70 proximate to end 62 of first frame 51 to end 132 at member 71 proximate to end 63 of first frame 51. Intermediate member 130B extends upright, concurrently with rails 90 and 91 of intermediate support 80B, between rails 90 and 91 of intermediate support 80B from lower edge 133 in FIG. 8 to upper edge 134 in FIGS. 8 and 9. Intermediate member 130B is mounted to rails 90 and 91 of intermediate support 80B of first frame 51 for movement between its lowered position in FIGS. 7, 8, and 9 relative to conveyor 53, and a raised position in FIGS. 17, 18, and 19 relative to conveyor 53. There is sufficient clearance between rails 90 and 91 of intermediate support 80B and intermediate member 130B to enable intermediate member 130B to slide reciprocally between, and relative to, rails 90 and 91 of intermediate support 80B between its lowered and raised positions.

In FIGS. 1 and 7, intermediate member 130B is mounted to rails 90 and 91 of intermediate support 80B of first frame 51 for movement between its lowered and raised positions with spaced-apart guide assemblies 140. In this embodiment, there are four guide assemblies 140 coupled between intermediate member 130B and intermediate support 80B of first frame 51. Guide assemblies 140 guide and constrain the movement of intermediate member 130B between its lowered and raised positions.

Guide assemblies 140 are spaced-apart along the length of intermediate member 130B between end 62 of first frame 51 and end 63 of first frame 51, and each include a pair of relatively reciprocally movable members including the shank of a nut-and-bolt fastener 141 and a cam slot 142 in FIG. 7. Nut-and-bolt fasteners 141 are carried by first frame 51, and cam slots 142 are carried by intermediate member 130B of second frame 52. Rails 90 and 91 of intermediate support 80B are connected by nut-and-bolt fasteners 141, the bolts of which extend through appropriate holes therein rails 90 and 91. In FIG. 7, shanks 145 of the bolts of the nut-and-bolt fasteners 141 extend through correspondingly spaced-apart cam slots 142 formed through intermediate member 130B. Cam slots 142 are elongate, include closed lower and upper ends 142A and 142B, and are up-angled from closed lower end 142A toward lower edge 133 to closed upper end 142B toward upper edge 134 in a direction from end 62 of first frame 51 to end 63 of first frame 51, therefore being down-angled from closed upper end 142B toward upper edge 134 to closed lower end 142A toward lower edge 133 in a direction from end 63 of first frame 51 to end 62 of first frame 51. Again, guide assemblies 140 guide and constrain the movement of intermediate member 130B between its lowered position in FIGS. 7 and 12 and its raised position in FIG. 18. Cam slots 142 slide over the respective shanks 145 from upper end 142A of slots 142 to lower ends 142B of slots 142, when intermediate member 130B moves from its lowered position in FIG. 7 to its raised position in FIG. 17. Cam slots 142 likewise slide over the respective shanks 145 from lower ends 142B of slots 142 to upper ends 142A of slots 142, when intermediate member 130B moves from its raised position in FIG. 17 to its lowered position in FIG. 7. The inherent interaction of cam slots 142 against the corresponding shanks 145 guide intermediate member 130B from its lowered position to its raised position, and guide intermediate member 130B from its raised position to its lowered position. Shanks 145 contact the respective upper ends 142A of slots 142 in FIG. 7 when intermediate member 130B is in its lowered position, which disables intermediate member 130B from moving beyond its lowered position. Shanks 145 contact the respective lower ends 142B of slots 142 in FIG. 17 when intermediate member 130B is in its raised position, which disables intermediate member 130B from moving beyond its raised position.

In FIGS. 9 and 14, upper edge 134 of intermediate member 130B is parallel to plane P1 of first frame 51 and load-conveying plane P2 of conveyor 53. Upper edge 134 of intermediate member 130B lies below conveyor 53, meaning below plane P2 of conveyor 53, between sides 53C and 53D of conveyor 53 from end 53A of conveyor 53 to end 53B of conveyor 53, when intermediate member 130B is in its lowered position in FIGS. 9 and 14. In FIG. 19, upper edge 134 of intermediate member 130B lies proud of conveyor 53, meaning above plane P2 of conveyor 53, between sides 53C and 53D of conveyor 53 from end 53A of conveyor 53 to end 53B of conveyor 53, when intermediate member 130B is in its raised position. Identically to intermediate member 130B, upper edges 134 of the respective side member 130A and 130C are parallel to plane P1 of first frame 51 and load-conveying plane P2 of conveyor 53, upper edge 134 of side member 130A lies below conveyor 53, meaning below plane P2 of conveyor 53, proximate to side 53C of conveyor 53 from end 53A of conveyor 53 to end 53B of conveyor 53, when side member 130A is in its lowered position, upper edge 134 of side member 130A lies proud of conveyor 53, meaning above plane P2 of conveyor 53, proximate to side 53C of conveyor 53 from end 53A of conveyor 53 to end 53B of conveyor 53, when side member 130A is in its raised position, upper edge 134 of side member 130C lies below conveyor 53, meaning below plane P2 of conveyor 53, proximate to side 53D of conveyor 53 from end 53A of conveyor 53 to end 53B of conveyor 53, when side member 130C is in its lowered position, and upper edge 134 of side member 130C lies proud of conveyor 53, meaning above plane P2 of conveyor 53, proximate to side 53D of conveyor 53 from end 53A of conveyor 53 to end 53B of conveyor 53, when side member 130C is in its raised position.

Upper edges 134 of the respective members 130 concurrently reside along plane P3, denoted in FIGS. 9, 14, and 19, which is parallel to plane P1 of first frame 51 and load-conveying plane P2 of conveyor 53, when members 130 are in their lowered positions and when members 130 are in their raised positions. Plane P3 lies below conveyor 53, meaning below plane P2 of conveyor 53, when members 130 are concurrently in their lowered positions, and lies proud of conveyor 53, meaning above plane P2 of conveyor 53, when members 130 are concurrently in their raised positions. Conveyor 53 is for conveying load L placed thereon in FIG. 8, the load L extending across conveyor 53 from side 60 of first frame 51 to side 61 of first frame 51, along load-conveying plane P2 without interference from upper edges 134 of members 130, when members 130 are concurrently in their lowered positions. Members 130 are for supporting the load L placed thereon atop upper edges 134 above conveyor 53 in FIG. 23, the load L extending from side 60 of first frame 51 to side 61 of first frame 51 from across upper edge 134 of side member 130A and across upper edge 134 of intermediate member 130B to across upper edge 134 of side member 130C, meaning above plane P2 of conveyor 53, for relieving conveyor 53 of the load for disabling conveyor 53 from conveying the load while at the same time securing the load relative to conveyor 53, when members 130 are concurrently in their raised positions. Second frame 52 is in its lowered position, when members 130 are concurrently in their lowered positions. Second frame 52 is in its raised position, when members 130 are concurrently in their raised positions.

Apparatus 50 incorporates drive member 150, in FIGS. 1-3 and 6. Drive member 150, an elongate shaft, is mounted rotatably to first frame 51, and is operatively coupled to second frame 52, whereby rotation of drive member 150 from a lowering position in FIGS. 1, 2, and 6 to a raising position in FIGS. 15 and 16 urges corresponding movement of second frame 52 from the lowered position of second frame 52 to the raised position of second frame 52, and rotation of drive member 150 from its raising position to its lowering position urges corresponding movement of second frame 52 from the raised position of second frame 52 to the lowered position of second frame 52. More specifically, drive member 150 is operatively coupled to members 130, whereby rotation of drive member 150 from a lowering position in FIGS. 1, 2, and 6 to a raising position in FIGS. 15 and 16 urges corresponding concurrent movement of members 130 from their lowered positions, defining the lowered position of second frame 52, to their raised positions, defining the raised position of second frame 52, and rotation of drive member 150 from its raising position to its lowering position urges corresponding concurrent movement of members 130 from their raised positions to their lowered positions. Because members 130 are concurrently operatively connected to drive member 150, which is used to concurrently move members 130 between their lowered and raised positons, members 130 constitute second frame 52 and work in concert with one another as second frame 52.

Drive member 150 is rotatable by hand by a hand-powered crank, namely, hand crank 155. Drive member 150 extends rotatably through crank support 151 affixed rigidly, such as by welding, to the outer side of rail 90 of side support 80A, and extends concurrently and rotatably through supports 80, through suitable axially-aligned openings in rails 90 and 91 of supports 80, and through members 130, through suitable axially-aligned notches 162 in members 130. Drive member 150 is operatively coupled to second frame 52, with cams carried by drive member 150, whereby rotation of drive member 150 from its lowering position to its raising position rotates the cams from their lowering positions to their raising positions against second frame 52 urging second frame 52 from the lowered position to the raised position, and rotation of drive member 150 from its raising position to its lowering position rotates the cams from their raising positions to their lower positions against second frame 52 urging second frame 52 from the raised position to the lowered position. More specifically, drive member 150 is operatively coupled to members 130, with cams carried by drive member 150, whereby rotation of drive member 150 from its lowering position to its raising position rotates the cams from their lowering positions to their raising positions against members 130 concurrently urging members 130 from their lowered position to their raised positions, and rotation of drive member 150 from its raising position to its lowering position rotates the cams form their raising positions to their lower positions against members 130 concurrently urging members 130 from their raised positions to their lowered positions.

Hand crank 155 is along side 60 of first frame 51 outboard of crank support 51, and is connected rigidly to drive member 150 and rotatably to crank support 151. Hand crank 155, operable by hand, rotates between a lowering position in FIGS. 1, 2, 6 and a raising position in FIGS. 15 and 16. Drive member 150 moves from its lowering position to its raising position, when hand crank 155 is cranked by hand from its lowering position to its raising position. Likewise, drive member 150 moves from its raising position to its lowering position, when hand crank 155 is cranked by hand from its raising position to its lowering position.

Crank support 151 is equidistant between ends 62 and 63 of first frame 51. Drive member 150 is equidistant between ends 62 and 63 of first frame 51, extends rotatably through crank support 151 from hand crank 155 and from hand crank 155 centrally through the suitable axially-aligned openings in rails 90 and 91 of supports 80, and centrally through the axially-aligned notches 162 in members 130 between opposed rollers 100 of conveyor 53. Drive member 150 is parallel relative to members 70 and 71 and to ends 62 and 63 of first frame 51 and to rollers 100, and is perpendicular relative to supports 80 and members 130. Drive member 150 is operatively coupled to members 130 centrally via the cams carried by drive member 150. Since drive member 150 is a shaft that incorporates cams, drive member 150 is a cam shaft. The cams and their concurrent interactions with the respective members 130 are identical. Accordingly, the details of one cam with intermediate member 130B will now be discussed, with the understanding that the ensuing discussion applies in every respect to the cam that operates with side member 130A and the cam that operates with side member 130C.

In FIG. 7, cam 160 is rigidly mounted around drive member 150 and resides in a notch 162 formed centrally in intermediate member 130B equidistant with respect to ends 131 and 132. Two spaced-apart guide assemblies 140 are on either side of notch 162. Notch 162 extends upwardly into intermediate member from lower edge 133, and includes opposed, parallel lowering and raising surfaces 163 and 164 that extend upright from lower edge 133 to end surface 165, which is parallel with respect to lower and upper edges 133 and 134. Cam 160 is an elongated body such that its rotary motion in and against notch 162 imparted when drive member 150 rotates urges reciprocating movement of intermediate member 130B between its lowered and raised positions guided by guide assemblies 140. The lifting and lowering forces are applied by cam 160 centrally against intermediate member 130B, which ensures an even raising and lowering of intermediate member 130B in response to rotation of cam 160 between its lowering and raising positions.

FIG. 7 shows intermediate member 130B of second frame 52 in its lowered position relative to conveyor 53 corresponding to the lowering position of hand crank 151 in FIG. 1, and illustrates cam 160 as it would appear in its corresponding lowering position extending horizontally between lowering and raising surfaces 163 and 164. To move intermediate member 130B upwardly from its lowered position to its raised position, drive member 150 is rotated in the direction of arcuate arrowed line A in FIG. 7, a raising direction of rotation, from its lowering position to an intermediate position by displacing hand crank 155 from its lowering position in FIG. 1 to its upright intermediate position in FIGS. 10 and 11. FIG. 10 is a top plan view of apparatus 50 showing hand crank 155 as it would appear displaced from its lowering position in FIG. 1 to its intermediate position. FIG. 11 is a perspective view corresponding to the embodiment of FIG. 10 without crank support 151 to better illustrate drive member 150 and hand crank 155 connected rigidly to drive member 150. Cam 160 rotates concurrently with drive member 150 from its lowering position in FIG. 7 to its intermediate position in FIG. 12 in direct contact against raising surface 164 of notch 162, when drive member 150 rotates in the direction of arcuate arrowed line A in FIG. 7 when hand crank 155 is moved from its lowering position in FIG. 1 to its intermediate position in FIGS. 10 and 11. FIG. 12 illustrates intermediate member 130B of second frame 52 in its lowered position relative to conveyor 53 corresponding to the intermediate position of hand crank 155 in FIGS. 10 and 11, and cam 160 as it would appear rotated in notch 162 from its lowering position in FIG. 7 to its intermediate position extending upright in notch 162 in direct contact against raising surface 164. FIG. 13 is an end elevation view of the embodiment of FIG. 10, and FIG. 14 is an enlarged, fragmentary view corresponding to the embodiment of FIG. 10 illustrating intermediate member 130B of second frame 52 as it would appear in its lowered position corresponding to the intermediate positions of hand crank 155 and cam 160.

Rotation of drive member 150 in the direction of arrowed line A in FIG. 7 is continued from its intermediate position in FIGS. 10 and 11 to its raising position in FIG. 17 by displacing hand crank 155 from its upright intermediate position in FIGS. 10 and 11 to its raising position extending along side 60 of first frame 51 toward end 63 in FIGS. 15 and 16. FIG. 15 is a top plan view of apparatus 50 showing hand crank 155 as it would appear displaced from its intermediate position in FIGS. 10 and 11 to its raising position. FIG. 16 is a perspective view corresponding to the embodiment of FIG. 15 without crank support 151. Cam 160 rotates concurrently with drive member 150 against raising surface 164 from its upright intermediate position in FIG. 12 to its raising position in FIG. 17 extending horizontally between lowering and raising surfaces 163 and 164, when drive member 150 rotates in the direction of arcuate arrowed line A in FIG. 12 when hand crank 155 is moved from its intermediate position in FIGS. 10 and 11 to its lowering position in FIGS. 15 and 16. Cam 160 acts directly against raising surface 164 when cam 160 rotates from its upright intermediate position in FIG. 12 to its raising position in FIG. 17 urging intermediate member 130B laterally in the direction of arrowed line B in FIG. 12 from end 62 of first frame 51 to end 63 of first frame 51, whereby cam slots 142 slide over the respective shanks 145 in response from upper end 142A of slots 142 to lower ends 142B of slots 142 urging and guiding intermediate member 130B upwardly from its lowered position relative to conveyor 53 in FIG. 12 to its raised position relative to conveyor 53 in FIG. 17, in which conveyor 53 is not visible in FIG. 17 because conveyor 53 is concealed behind intermediate member 130B. FIG. 18 is an end elevation view of the embodiment of FIG. 15, and FIG. 19 is an enlarged, fragmentary view corresponding to the embodiment of FIG. 15 illustrating intermediate member 130B of second frame 52 in the raised position relative to conveyor 53. Having so moved intermediate member 130B from is lowered position to its raised position, intermediate member 130B may then be moved from its raised position back to its lowered position.

To move intermediate member 130B from its raised position back to its lowered position, drive member 150 is rotated in the direction of arcuate arrowed line B in FIG. 17, a lowering direction of rotation, from its raising position to its intermediate position by displacing hand crank 155 from its raising position in FIGS. 15 and 16 to its upright intermediate position in FIGS. 20 and 21. FIG. 20 is a top plan view of apparatus 50 showing hand crank 155 as it would appear displaced from its raising position in FIGS. 15 and 16 to its intermediate position. FIG. 21 is a perspective view corresponding to the embodiment of FIG. 20 without crank support 151. Cam 160 rotates concurrently with drive member 150 from its raising position in FIG. 17 to an upright intermediate position in FIG. 22 in direct contact against lowering surface 163, when drive member 150 rotates in the direction of arcuate arrowed line B in FIG. 17 when hand crank 155 is moved from its raising position in FIGS. 15 and 16 to its upright intermediate position in FIGS. 20 and 21. FIG. 22 illustrates intermediate member 130B of second frame 52 in its raised position corresponding to the intermediate position of hand crank 155 in FIGS. 20 and 21 from the raising position of hand crank 155, and cam 160 as it would appear rotated from its raising position in FIG. 17 to its intermediate position extending upright in notch 162 in direct contact against lowering surface 163. FIG. 23 is an end elevation view of the embodiment of FIG. 20, and FIG. 24 is an enlarged, fragmentary view corresponding to the embodiment of FIG. 20 illustrating intermediate member 130B of second frame 52 as it would appear in its raised position corresponding to the intermediate positions of hand crank 155 and cam 160 from their respective raising positions.

Rotation of drive member 150 in the direction of arcuate arrowed line B in FIG. 22, the lowering direction of rotation, is continued from its intermediate position in FIGS. 20 and 21 to its lowering position in FIG. 1 by displacing hand crank 155 from its upright intermediate position in FIGS. 20 and 21 to its lowering position extending along side 60 of first frame 51 toward end 62 of first frame 51 in FIG. 1. Cam 160 rotates concurrently with drive member 150 from its upright intermediate position in FIG. 22 to its lowering position in FIG. 7, when drive member 150 rotates in the direction of arcuate arrowed line B in FIG. 17 when hand crank 155 is moved from its intermediate position in FIGS. 20 and 21 to its lowering position in FIG. 1. Cam 160 acts against directly against lowering surface 163 when cam 160 rotates from its upright intermediate position in FIG. 22 to its lowering position in FIG. 7 urging intermediate member 130B laterally in the direction of arrowed line D in FIG. 22 from end 63 of first frame 51 to end 62 of first frame 51, whereby cam slots 142 slide over the respective shanks 145 in response from lower ends 142A of slots 142 to upper ends 142A of slots 142 urging and guiding intermediate member 130B downwardly from its raised position in FIG. 22 to its lowered position in FIG. 7.

Apparatus 50 is useful for conveying loads when second frame 52 in the lowered position, and securing or otherwise supporting loads by second frame 52 in a stable fashion from conveyor 53 for transport when second frame 52 is in the raised position. Again, upper edges 134 of the respective members 130 concurrently reside along plane P3, denoted in FIGS. 9, 14, and 19, which is parallel to plane P1 of first frame 51 and load-conveying plane P2 of conveyor 53 when members 130 are in their lowered positions and when members 130 are in their raised positions. Plane P3 lies below conveyor 53, meaning below plane P2 of conveyor 53, when members 130 are concurrently in their lowered positions, and lies proud of conveyor 53, meaning above plane P2 of conveyor 53, when members 130 are concurrently in their raised positions. Conveyor 53 is for conveying load L placed thereon in FIG. 8, the load L extending across conveyor 53 from side 60 of first frame 51 to side 61 of first frame 51 across upper edges 134 of members 130, along load-conveying plane P2 without interference from upper edges 134 of members 130, when members 130 are concurrently in their lowered positions defining the conveying configuration of apparatus 50. Load L placed atop conveyor 53 from side 60 of first frame 51 to side 61 of first frame 51 across upper edges 134 of members 130 is lifted above and away from conveyor 53 by upper edges 134 of members 130 when members 130 are moved from their lowered positions in FIG. 8 to their raised positions in FIG. 23 via handed crank 155 in FIG. 1 defining the pallet configuration of apparatus 50. Members 130 are for supporting the load L placed thereon atop upper edges 134 above and away from conveyor 53 in FIG. 23 from side 60 of first frame 51 to side 61 of first frame 51, meaning above plane P2 of conveyor 53, for relieving conveyor 53 of the load for disabling conveyor 53 from conveying the load while at the same time frictionally securing the load L relative to conveyor 53 via the frictional contact between the load L and upper edges 134 of members 130, when members 130 are concurrently in their raised positions. Load L is lowered atop conveyor 53 in FIG. 8 for being conveyed thereby, when members 130 are lowered from their raised positions to their lowered positions. Again, second frame 52 is in its lowered position, when members 130 are concurrently in their lowered positions, and second frame 52 is in its raised position, when members 130 are concurrently in their raised positions.

In sum, second frame 52 is for supporting the load placed thereon above conveyor 53 for relieving conveyor 53 of the load for disabling conveyor 53 from conveying the load while at the same time securing the load relative to conveyor 53 in a stable fashion, like a pallet, when second frame 52 is in the raised position. When second frame 52 is in its lowered position, conveyor 53 is enabled to convey a load placed thereon, for load onloading and offloading, without interference from second frame 52. When second frame 52 is in its raised position, second frame 52 is enabled to hold a load placed thereon above conveyor 53 and support the load in a stable fashion. Apparatus 50 is in the conveying configuration, when second frame 52 is in its lowered position relative to conveyor 53, and apparatus 50 is in a transport or pallet configuration, when second frame 52 is in its raised position relative to conveyor 53. When second frame 52 is in its lowered position relative to conveyor 53 and a load is placed atop conveyor 53 over second frame 52 and second frame 52 is moved from its lowered position relative to conveyor 53 to its raised position relative to conveyor 53, second frame 52 lifts the load upwardly away from conveyor 53 disabling conveyor 53 from interacting conveyingly with the load. When second frame 52 is in its raised position and a load is placed atop second frame 52 and second frame 52 is moved from its raised position to its lowered position, second frame 52 lowers the load downwardly atop conveyor 53 for enabling conveyor 53 to interact conveyingly with the load.

An alternate embodiment of a load-conveying and transport apparatus 200 is shown in FIGS. 25, 26, and 27. Apparatus 200 functions identically to apparatus 50 with the exception of certain details discussed below. To the extent that apparatus 200 operates identically to apparatus 50, the discussion of apparatus 50 applies in every respect to apparatus 200.

Apparatus 50 is a flat load-conveying and transport assembly. Apparatus 200 includes frame 201, conveyor 203 and, in common with apparatus 50, second frame 52, supports 80, drive member 150, hand crank 155, and planes P1, P2, and P3, in which second frame includes members 130 mounted to the corresponding supports 80. Frame 201 is a first frame and, again, frame 52 is the second frame. Conveyor 203 is carried by frame 201. As in apparatus 50, second frame 52 is mounted to frame 201 for movement between its lowered position relative to conveyor 203 and frame 201 in FIG. 25, and its raised position relative to conveyor 203 and frame 201 in FIG. 27. Second frame 52 lies below conveyor 203, when second frame 52 is in the lowered position relative to conveyor 203. Second frame 52 lies proud of conveyor 203, when second frame 52 is in the raised position relative to conveyor 203. Conveyor 203 is operable for conveying a load placed thereon from one location to another, from one end of conveyor 203 proximate to one end of first frame 201 to another end of conveyor 203 proximate to another end of first frame 201, without interference from second frame 52, when second frame 52 is in the lowered position relative to conveyor 203 in FIGS. 25 and 26. Identically to apparatus 50, in apparatus 200 second frame 52 is for supporting the load placed thereon above conveyor 203 for relieving conveyor 53 of the load for disabling conveyor 203 from conveying the load while at the same time securing the load relative to conveyor 203, when second frame 52 is in the raised position in FIG. 27.

In FIG. 25, first frame 51 is fashioned of metal, such as steel or aluminum, or other equivalent strong, durable material, is rectangular in overall shape, and is a platform 210 that includes upper surface 211, lower surface 212, for placement against a supporting platform or fixture, and opposed parallel sides 213 and 214 that extend between opposed parallel ends 215 and 216. Sides 213 and 214 are equal in length and ends 215 and 216 are equal in length. The length of each one of sides 213 and 214 is greater than the length of each of ends 215 and 216, characterizing the overall rectangular shape of first frame 201.

Supports 80 are rigidly connected to the upper surface 211 of platform 210, via welding, and nut-and-bolt assemblies, rivets, or other equivalent mechanical fastening can be used in alternate embodiments. Supports 80 are parallel relative to each other and to sides 213 and 214, are perpendicular relative to ends 215 and 215, extend from end 215 of platform 210 to end 216 of platform 210. Side support 80 is adjacent to side 213, intermediate support 80B is between sides 213 and 214, and side support 80C is adjacent to side 214. Intermediate support 80B is between and equidistant with respect to side supports 80A and 80C.

In apparatus 200, conveyor 53 includes rollers 220. In this embodiment, rollers 220 are identical ball rollers of metal, such as steel or aluminum, or other equivalent strong, durable material. While cylinder rollers 100 in apparatus 50 are suitable for conveying a load thereon linearly, in a direction that is perpendicular to the axes of rotation of cylinder rollers 100, ball rollers 220 enable translation of a load placed therein in all directions. In apparatus 200, ball rollers 220, which are entirely conventional, are rigidly affixed to upper surface 211 via rivets, threaded fasteners, or welding, extend upright from upper surface 211, and are spaced apart distributed along upper surface 211, being between ends 215 and 216 of platform 210 between side 213 and side support 80C, being side support 80A and intermediate support 80B, between intermediate support 80B and side support 80C, and between side support 80C and side 214 of platform 210.

Rollers 220 define conveyor 203, which is roller conveyor. Rollers 220 adjacent to end 215 of platform 210 define one end 203A of conveyor 203, rollers 220 adjacent to end 216 of platform 210 define the opposite other end 203B of conveyor 203, rollers 220 adjacent to side 213 of platform 210 define one side 203C of conveyor 203, and rollers 220 adjacent to side 214 of platform 210 define the opposite other side 203D of conveyor 203. Ends 203A and 203B of conveyor 203 extend from adjacent to side 213 of platform 210 to adjacent to side 214 of platform 210, and sides 203C and 203D of conveyor 203 extend from adjacent to end 215 of platform 210 to adjacent to end 216 of platform 210.

Rollers 220 are for conveying a load placed thereon in all directions, including from one location to another, such as from end 203A of conveyor 203 to end 203B and from side 203C of conveyor 203 to side 203D of conveyor 203. Upright guard rails 230 extend upright from upper surface 211 of platform 210 at either side thereof for preventing a load placed on rollers 220 from rolling off conveyor 203 from either side of platform 210. Rollers 220 extend slightly above plane P1 defined by supports 80 of first frame 201 to load-conveying plane P2 where the load placed on rollers 220 resides when the load is placed atop rollers 220 for being conveyed thereby. As in apparatus 50, in apparatus 200 load-conveying plane P2 is parallel to plane P1 of first frame 201 and lies proud of plane P1 of first frame 201, meaning that load-conveying plane P2, the uppermost plane through which rollers 220 rotate, lies slightly above plane P2 of first frame 201, which enables rollers 220 to convey a load placed thereon along load-conveying plane P2 without interference from first frame 201, including supports 80.

In apparatus 200, drive member 150 is mounted rotatably to stays 235 at either side 213 and 214 of platform equidistant between ends 215 and 216, and is operatively coupled to members 130 of second frame 52 as in apparatus 50, whereby rotation of drive member 150 from a lowering position in FIG. 25 to a raising position in FIG. 27 urges corresponding movement of members 130 defining second frame 52 from their lowered positions in FIG. 25 defining the lowered position of second frame 52 to their raised positions in FIG. 27 defining the raised position of second frame 52, and rotation of drive member 150 from its raising position in FIG. 27 to its lowering position in FIG. 25 urges corresponding movement of members 130 defining second frame 52 from their raised positions in FIG. 27 defining the raised position of second frame 52 to their lowered positions defining the lowered position of second frame 52.

Hand crank 155 is along side 213 of first frame 201 and is connected rigidly to one end of drive member 150. Hand crank 155, operable by hand, rotates between its lowering position in FIG. 25 and its raising position in FIG. 27. Drive member 150 moves from its lowering position to its raising position, when hand crank 155 is cranked by hand from its lowering position to its raising position. Likewise, drive member 150 moves from its raising position to its lowering position, when hand crank 155 is cranked by hand from its raising position to its lowering position.

Another hand crank 236 is along side 214 of first frame 201 and is connected rigidly to the other end of drive member 150. Like hand crank 155, hand crank 236, operable by hand, rotates between its lowering position in FIG. 25 and its raising position in FIG. 27. Drive member 150 moves from its lowering position to its raising position, when hand crank 155 is cranked by hand from its lowering position to its raising position. Likewise, drive member 150 moves from its raising position to its lowering position, when hand crank 155 is cranked by hand from its raising position to its lowering position. Drive member 150 can be rotated using either hand crank 155 or hand crank 236.

As in apparatus 50, in apparatus 200 members 130 work in concert with one another, and lie below conveyor 203, meaning below plane P2 of conveyor 203, when members 130 are in their lowered positions, and lie proud conveyor 203, meaning above plane P2 of conveyor 203, when members are in their raised positions. Apparatus 200 is useful for conveying loads when second frame 52 is in the lowered position, and securing loads by second frame 52 from conveyor 203 for transport when second frame 52 is in the raised position. Again, plane P3 defined by members 130 is parallel to plane P1 of first frame 201 and load-conveying plane P2 of conveyor 203 when members 130 are in their lowered positions in FIGS. 25 and 26 and when members 130 are in their raised positions in FIG. 27. Plane P3 lies below conveyor 203, meaning below plane P2 of conveyor 203, when members 130 are concurrently in their lowered positions, and lies proud of conveyor 203, meaning above plane P2 of conveyor 203, when members 130 are concurrently in their raised positions. Conveyor 203 is for conveying a load placed thereon, the load extending from across members 130 between sides 213 and 213 of first frame 201, along load-conveying plane P2 without interference from members 130, when members 130 are concurrently in their lowered positions. The load placed atop conveyor 203 across members 130 between sides 213 and 214 of first frame 201 is lifted above and away from conveyor 203 by members 130 when members 130 are moved from their lowered positions in FIGS. 25 and 26 to their raised positions in FIG. 27 via handed crank 155. Members 130 are for supporting the load placed thereon above and away from conveyor 203, meaning above plane P2 of conveyor 203, for relieving conveyor 203 of the load for disabling conveyor 203 from conveying the load while at the same time frictionally securing the load relative to conveyor 203 via the frictional contact between the load and members 130, when members 130 are concurrently in their raised positions, as described in apparatus 50. Again, in apparatus 200 second frame 52 is in its lowered position, defining the conveying configuration of apparatus 200, when members 130 are concurrently in their lowered positions, and second frame 52 is in its raised position, defining the pallet configuration of apparatus 200, when members 130 are concurrently in their raised positions.

Hand cranks 155 and 236 connected to either end of drive member 150 can be taken up selectively by hand imparting rotation to drive member 150 when the hand crank 155 and 236 are moved between their lowering and raising positions by hand. FIG. 26 is a view corresponding to FIG. 25 showing the hand cranks 155 and 236 displaced from the lowering position in FIG. 25 to an intermediate position between their lowering positions in FIG. 25 and their raising positions in FIG. 27, and FIG. 27 is a view corresponding to FIG. 26 showing the hand cranks 155 and 236 displaced from their intermediate positions to their raising positions.

In apparatus 50, conveyor 53 is formed by rollers 100, which are cylinder rollers for conveying loads linearly. In apparatus 200, conveyor 203 is formed by rollers 220, which are ball rollers for conveying loads in all directions. An apparatus constructed and arranged in accordance with the invention can incorporate other conveyor types, such as belt conveyors, bearing conveyors, and the like, without departing from the invention.

The present invention is described above with reference to illustrative embodiments. However, those skilled in the art will recognize that changes and modifications may be made in the described embodiments without departing from the nature and scope of the present invention. Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A load-conveying and transport apparatus, comprising:
   a frame;
   a conveyor, the conveyor is carried by the frame and includes opposed first and second sides that extend between opposed first and second ends;
   a first member proximate to the first side of the conveyor, a second member proximate to the second side of the conveyor, and a third member between the first and second sides of the conveyor and between the first member and the second member, the first member, the second member, and the third member each extends from the first end of the conveyor to the second end of the conveyor;
   the first member, the second member, and the third member are each mounted to the frame for movement between a lowered position and a raised position relative to the conveyor;
   the first member lies below the conveyor proximate to the first side of the conveyor from the first end of the conveyor to the second end of the conveyor, the second member lies below the conveyor proximate to the second side of the conveyor from the first end of the conveyor to the second end of the conveyor, and the third member lies below the conveyor between the first and second sides of the conveyor from the first end of the conveyor to the second end of the conveyor, when the first member, the second member, and the third members are each in the lowered position relative to the conveyor;
   the first member lies above of the conveyor proximate to the first side of the conveyor from the first end of the conveyor to the second end of the conveyor, the second member lies above of the conveyor proximate to the second side of the conveyor from the first end of the conveyor to the second end of the conveyor, and the third member lies above of the conveyor between the first and second sides of the conveyor from the first end of the conveyor to the second end of the conveyor, when the first member, the second member, and the third members are each in the raised position relative to the conveyor;
   the conveyor is for conveying a load placed thereon from the first end of the conveyor to the second end of the conveyor without interference from the first member, the second member, and the third member, when the first member, the second member, and the third member are each in the lowered position relative to the conveyor;
   the first member, the second member, and the third member are for supporting a load placed thereon above the conveyor for disabling the conveyor from conveying the load from the first end of the frame to the second end of the frame, when the first member, the second member, and the third member are each in the raised position relative to the conveyor;
   a drive member mounted rotatably to the frame, the drive member is operatively coupled to the first member, the second member, and the third member, whereby rotation of the drive member from a first position to a second position urges corresponding concurrent movement of the first member, the second member, and the third member from the lowered positions to the raised positions, and rotation of the drive member from the second position to the first position urges corresponding concurrent movement of the first member, the second member, and the third member from the raised positions to the lowered positions; and
   the drive member is operatively coupled to the first member, the second member, and the third member with a first cam, a second cam, and a third cam respectively, whereby rotation of the drive member from the first position to the second position rotates the first cam, the second cam, and the third cam against the first member, the second member, and the third member, respectively, urging the first member, the second member, and the third member from the lowered positions to the raised positions, and rotation of the drive member from the second position to the first position rotates the first cam, the second cam, and the third cam against the first member, the second member, and the third member, respectively, urging the first member, the second member, and the third member from the raised positions to the lowered.

2. The load-conveying and transport apparatus according to claim 1, further comprising a hand crank connected to the drive member for impartation to the drive member.

3. The load-conveying and transport apparatus according to claim 1, wherein the conveyor comprises rollers.

4. The load-conveying and transport apparatus according to claim 3, wherein the rollers comprise a first set of the rollers between the first member and the third member, and a second set of the rollers between the second member and the third member.

5. The load-conveying and transport apparatus according to claim 1, wherein the first member, the second member, and the third member are each mounted to the frame for movement between the lowered position and the raised position with spaced-apart guide assemblies.

6. The load-conveying and transport apparatus according to claim 5, wherein the guide assemblies each comprise a pair of relatively reciprocally movable members.

7. The load-conveying and transport apparatus according to claim 6, wherein one of the pair of relatively reciprocally movable members is a shank received by a cam slot being the other one of the pair of relatively reciprocally movable members.

8. The load-conveying and transport apparatus according to claim 7, wherein the shanks are carried by the frame.

9. The load-conveying and transport apparatus according to claim 7, wherein the cam slots are carried by the first member, the second member, and the third member.

10. A load-conveying and transport apparatus, comprising:
    a frame;
    a conveyor, the conveyor is carried by the frame and includes opposed first and second sides that extend between opposed first and second ends;
    members, the members are spaced apart between the first side and the second side of the conveyor and each extends from the first end of the conveyor to the second end of the conveyor;
    the members are each mounted to the frame for movement between a lowered position and a raised position relative to the conveyor;
    the members lie below the conveyor from the first end of the conveyor to the second end of the conveyor, when the members are each in the lowered position relative to the conveyor;
    the members lie above of the conveyor from the first end of the conveyor to the second end of the conveyor, when the members are each in the raised position relative to the conveyor;
    the conveyor is for conveying a load placed thereon from the first end of the conveyor to the second end of the conveyor without interference from the members, when the members are each in the lowered position relative to the conveyor;
    the members are for supporting a load placed thereon above the conveyor for disabling the conveyor from conveying the load from the first end of the frame to the second end of the frame, when the members are each in the raised position relative to the conveyor; and
    the conveyor comprises rollers, there being a plurality of the rollers on either side of each of the members.

11. The load-conveying and transport apparatus according to claim 10, wherein the members are each mounted to the frame for movement between the lowered position and the raised position with spaced-apart guide assemblies.

12. The load-conveying and transport apparatus according to claim 11, wherein the guide assemblies each comprise a pair of relatively reciprocally movable members.

13. The load-conveying and transport apparatus according to claim 12, wherein one of the pair of relatively reciprocally movable members is a shank received by a cam slot being the other one of the pair of relatively reciprocally movable members.

14. The load-conveying and transport apparatus according to claim 13, wherein the shanks are carried by the frame.

15. The load-conveying and transport apparatus according to claim 13, wherein the cam slots are carried by the members.

16. The load-conveying and transport apparatus according to claim 10, wherein the rollers are ball rollers.

17. The load-conveying and transport apparatus according to claim 10, further comprising:
    a drive member mounted rotatably to the frame, the drive member is operatively coupled to the members, whereby rotation of the drive member from a first position to a second position urges corresponding concurrent movement of the members from the lowered positions to the raised positions, and rotation of the drive member from the second position to the first position urges corresponding concurrent movement of the members from the raised positions to the lowered positions; and
    the drive member is operatively coupled to the members with cams, respectively, whereby rotation of the drive member from the first position to the second position rotates the cams against the members, respectively, urging the members from the lowered positions to the raised positions, and rotation of the drive member from the second position to the first position rotates the cams against the members, respectively, urging the members from the raised positions to the lowered positions.

18. A load-conveying and transport apparatus, comprising:
    a frame;
    a conveyor, the conveyor is carried by the frame and includes opposed first and second sides that extend between opposed first and second ends;
    a first member and a second member, the first member and the second member are spaced apart, the first member is proximate to the first side of the conveyor, the second member is between the first and second sides of the conveyor, and the first member and the second member each extends from the first end of the conveyor to the second end of the conveyor;
    the first member and the second member are each mounted to the frame for movement between a lowered position and a raised position relative to the conveyor;
    the first member and the second member concurrently lie below the conveyor from the first end of the conveyor to the second end of the conveyor, when the first member and the second member are each in the lowered position relative to the conveyor;
    the first member and the second member concurrently lie above of the conveyor from the first end of the conveyor to the second end of the conveyor, when the first member and the second member are each in the raised position relative to the conveyor;

the conveyor is for conveying a load placed thereon from the first end of the conveyor to the second end of the conveyor without interference from the first member and the second member, when the first member and the second member are each in the lowered position relative to the conveyor;

the first member and the second member are for supporting a load placed thereon above the conveyor for disabling the conveyor from conveying the load from the first end of the frame to the second end of the frame, when the first member and the second member are each in the raised position relative to the conveyor; and the conveyor comprises rollers, there being a first plurality of the rollers between the first member and the second member, and a second plurality of rollers between the second member and the second side of the conveyor.

19. The load-conveying and transport apparatus according to claim 18, wherein the first member and the second member are each mounted to the frame for movement between the lowered position and the raised position with spaced-apart guide assemblies.

20. The load-conveying and transport apparatus according to claim 19, wherein the guide assemblies each comprise a pair of relatively reciprocally movable members.

21. The load-conveying and transport apparatus according to claim 20, wherein one of the pair of relatively reciprocally movable members is a shank received by a cam slot being the other one of the pair of relatively reciprocally movable members.

22. The load-conveying and transport apparatus according to claim 21, wherein the shanks are carried by the frame.

23. The load-conveying and transport apparatus according to claim 21, wherein the cam slots are carried by the first member and the second member.

24. The load-conveying and transport apparatus according to claim 18, wherein the rollers are cylinder rollers.

25. The load-conveying and transport apparatus according to claim 18, wherein the rollers are ball rollers.

26. The load-conveying and transport apparatus according to claim 18, further comprising:
a drive member mounted rotatably to the frame, the drive member is operatively coupled to the first member and the second member, whereby rotation of the drive member from a first position to a second position urges corresponding concurrent movement of the first member and the second member from the lowered positions to the raised positions, and rotation of the drive member from the second position to the first position urges corresponding concurrent movement of the first member and the second member from the raised positions to the lowered positions; and the drive member is operatively coupled to the members with cams, respectively, whereby rotation of the drive member from the first position to the second position rotates the cams against the first member and the second member, respectively, urging the first member and the second member from the lowered positions to the raised positions, and rotation of the drive member from the second position to the first position rotates the cams against the first member and the second member, respectively, urging the first member and the second member from the raised positions to the lowered positions.

27. A load-conveying and transport apparatus, comprising:
a frame;
a conveyor, the conveyor is carried by the frame and includes opposed first and second sides that extend between opposed first and second ends;
a member between the first side and the second side of the conveyor, the member extends from the first end of the conveyor to the second end of the conveyor;
the member is mounted to the frame for movement between a lowered position and a raised position relative to the conveyor;
the member lies below the conveyor from the first end of the conveyor to the second end of the conveyor for enabling the conveyor to convey a load placed thereon from the first end of the conveyor to the second end of the conveyor without interference from the member, when the member is in the lowered position relative to the conveyor;
the member lies above of the conveyor from the first end of the conveyor to the second end of the conveyor for supporting a load placed thereon above the conveyor for disabling the conveyor from conveying the load from the first end of the frame to the second end of the frame without interference from the member, when the member is in the raised position relative to the conveyor; and
the conveyor comprises rollers, there being a plurality of the rollers on either side of the member.

28. The load-conveying and transport apparatus according to claim 27, wherein the member is mounted to the frame for movement between the lowered position and the raised position with spaced-apart guide assemblies.

29. The load-conveying and transport apparatus according to claim 28, wherein the guide assemblies each comprise a pair of relatively reciprocally movable members.

30. The load-conveying and transport apparatus according to claim 27, wherein the rollers are cylinder rollers.

31. The load-conveying and transport apparatus according to claim 27, wherein the rollers are ball rollers.

* * * * *